United States Patent
Vasko et al.

(10) Patent No.: US 7,107,358 B2
(45) Date of Patent: *Sep. 12, 2006

(54) BRIDGE FOR AN INDUSTRIAL CONTROL SYSTEM USING DATA MANIPULATION TECHNIQUES

(75) Inventors: David A. Vasko, Macedonia, OH (US); Joseph A. Lenner, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 740 days.

This patent is subject to a terminal disclaimer.

(21) Appl. No.: 09/951,163

(22) Filed: Sep. 12, 2001

(65) Prior Publication Data

US 2003/0051053 A1    Mar. 13, 2003

(51) Int. Cl.
   G06F 15/16   (2006.01)
   G06F 15/173  (2006.01)
   G06F 11/00   (2006.01)
   G06F 7/02    (2006.01)
   H03M 13/00   (2006.01)
   G05B 15/00   (2006.01)

(52) U.S. Cl. ............... 709/249; 709/223; 714/4; 714/799; 714/819

(58) Field of Classification Search ........ 709/230, 709/249, 250; 714/799, 819, 4
   See application file for complete search history.

(56) References Cited

U.S. PATENT DOCUMENTS

| | | | |
|---|---|---|---|
| 5,245,616 A | 9/1993 | Olson | 714/748 |
| 5,642,354 A | 6/1997 | Spear | 370/329 |
| 5,754,548 A | 5/1998 | Hoekstra et al. | |
| 5,910,778 A | 6/1999 | Klein et al. | |
| 5,920,581 A | 7/1999 | Lang | 714/799 |
| 5,923,662 A | 7/1999 | Stirling et al. | |
| 6,032,202 A | 2/2000 | Lea et al. | |
| 6,044,480 A | 3/2000 | Keen | |
| 6,229,437 B1 | 5/2001 | Schmid et al. | 340/438 |
| 6,301,632 B1* | 10/2001 | Jaramillo | 710/105 |
| 6,525,647 B1* | 2/2003 | Calamatas | 714/819 |
| 6,601,210 B1 | 7/2003 | Kagan | 714/758 |
| 6,683,881 B1* | 1/2004 | Mijares et al. | 370/401 |
| 6,721,900 B1 | 4/2004 | Lenner et al. | 714/4 |

(Continued)

FOREIGN PATENT DOCUMENTS

EP    0 977 391 A2    2/2000

OTHER PUBLICATIONS

CANopen Safety: Safety-relevant communication, elektroniknet, Dec. 2000.*

(Continued)

*Primary Examiner*—Zarni Maung
*Assistant Examiner*—Hassan Phillips
(74) *Attorney, Agent, or Firm*—Keith M. Baxter; R. Scott Speroff

(57) ABSTRACT

A bridge usable in a highly reliable industrial control system provides an interface between a producer module transmitting redundant messages in accordance with a communication protocol and a consumer module receiving the messages in accordance with a different communication protocol. The bridge includes a first network interface receiving two messages from the producer, a microprocessor capable of converting the messages from the producer communication protocol to consumer communication protocol, and a second network interface transmitting the messages to the consumer. One of the messages is reversible altered with respect to the other message. The altered message is uninverted in the consumer module, and compared to the other message to ensure that no transmission errors have occurred.

24 Claims, 15 Drawing Sheets

U.S. PATENT DOCUMENTS

| | | | |
|---|---|---|---|
| 6,886,033 B1* | 4/2005 | Brush et al. | 709/217 |
| 2002/0038981 A1* | 4/2002 | Brown et al. | 307/125 |
| 2002/0095221 A1* | 7/2002 | Cook et al. | 700/4 |

OTHER PUBLICATIONS

CANopen Safety: Safety-relevant communication, elektroniknet, Dec. 15, 2000 (Abstract).

Controller Area Network (CAN), Phillips, International CAN Conference, Las Vegas, Dec. 3-5, 2001 (Abstract).

Microcontrollers, Philips, Apr. 13, 2001 (Abstract).

K. Cevik, CANopen SIG Safety, Fachhochschule Bielefeld, University of Applied Sciences, vol. 1, pp. 1-11, 1999.

D.A. Glanzer, "Interoperable Fieldbus Devices: A Technical Overviews," ISA Transactions 35, 147-151, 1996.

Esalan Safety Field Bus Control System, Elan Schaltelemente Crabnl.

EBUS 6000 Product List, Safenet Information, pp. 1.0-10.00, 1999.

Pilz, Safe Bus Systems, pp. 5-20, 1998.

Pilz, Review Extract, pp. 1-8, 1999.

Profisafe . . . in order to protect, 1999.

Profibus, Fail Safe with Profibus, pp. 1-57, 1999.

Safenet, Integrated Safety Control Syste, Smartscan.

Appendix A German Safety Bus Committee Specification, Draft Proposal of a Guideline for the Test and Certification of "Bus Systems for the Transmission of Safety Relevant Messages," Fachausschuss Elektrotechnik, Gustav-Heinemann-Ufer 130, 1999.

CANopen, Framework for Safety-Relevant Communication, Version 0.94 dated Sep. 12, 200, CAN in Automation e.V.

* cited by examiner

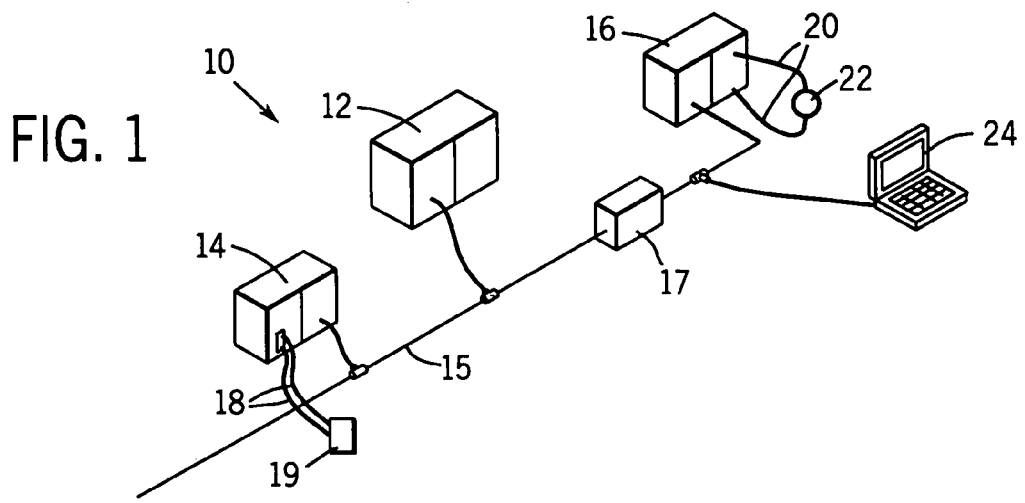
FIG. 1
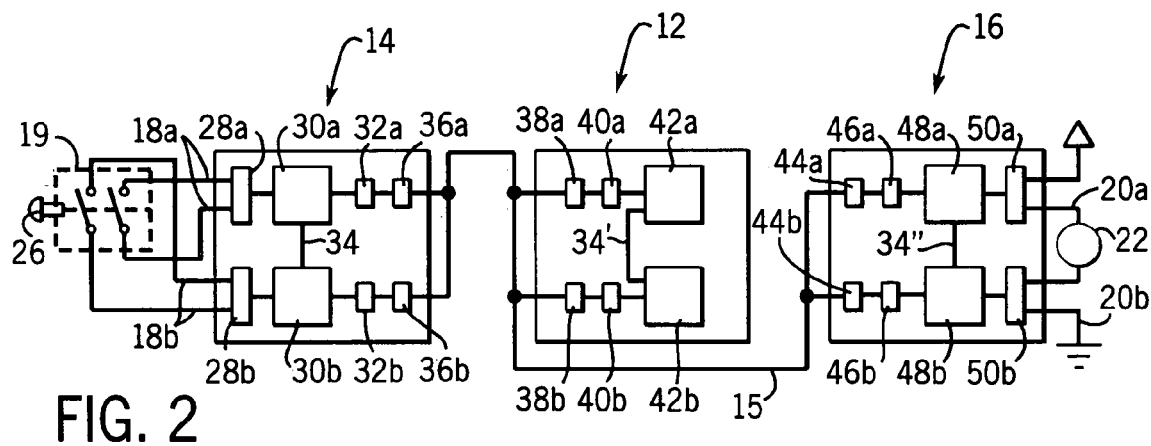
FIG. 2
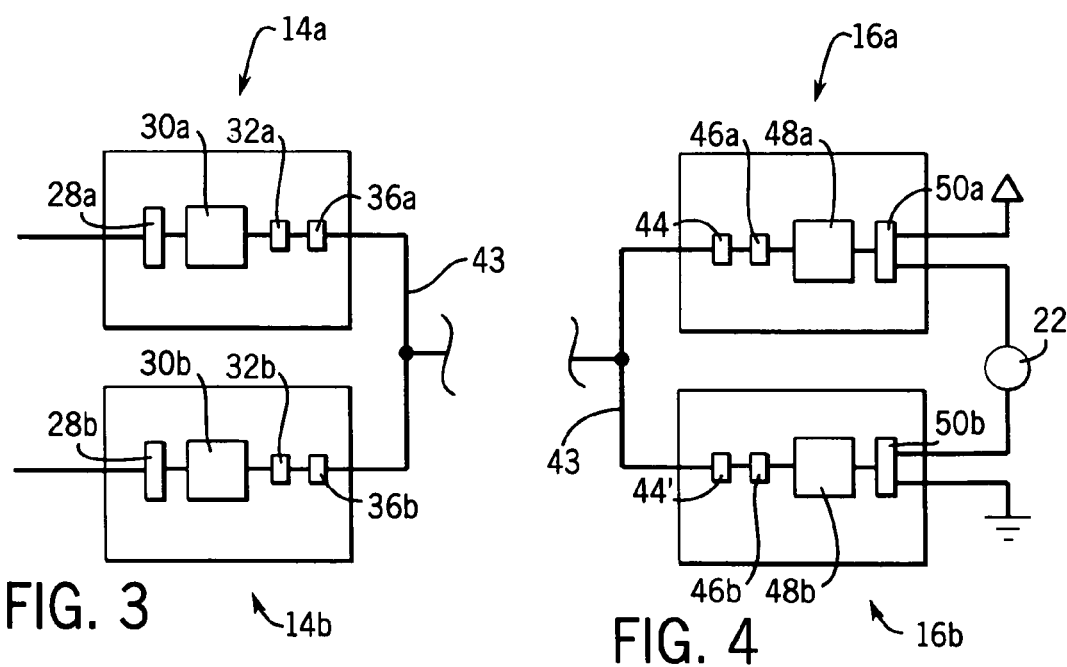
FIG. 3
FIG. 4

BRIDGE FOR AN INDUSTRIAL CONTROL SYSTEM USING DATA MANIPULATION TECHNIQUES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to industrial controllers used for real-time control of industrial processes, and in particular to high-reliability industrial controllers appropriate for use in devices intended to protect human life and health. "High reliability" refers generally to systems that guard against the propagation of erroneous data or signals by detecting error or fault conditions and signaling their occurrence and/or entering into a predetermined fault state. High reliability systems may be distinguished from high availability systems, however, the present invention may be useful in both such systems and therefore, as used herein, high reliability should not be considered to exclude high availability systems.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

"Safety systems" are systems intended to ensure the safety of humans working in the environment of an industrial process. Such systems may include the electronics associated with emergency stop buttons, interlock switches and machine lockouts. Traditionally, safety systems have been implemented by a set of circuits wholly separate from the industrial control system used to control the industrial process with which the safety system is associated. Such safety systems are "hard-wired" from switches and relays, some of which may be specialized "safety relays" allowing comparison of redundant signals and providing internal checking of conditions such as welded or stuck contacts. Safety systems may use switches with dual contacts providing an early indication of contact failure, and multiple contacts may be wired to actuators so that the actuators are energized only if multiple contacts close.

Hard-wired safety systems have proven inadequate, as the complexity of industrial processes has increased. This is in part because of the cost of installing and wiring relays and in part because of the difficulty of troubleshooting and maintaining the "program" implemented by the safety system in which the logic can only be changed by rewiring physical relays and switches.

For this reason, there is considerable interest in implementing safety systems using industrial controllers. Such controllers are easier to program and have reduced installation costs because of their use of a high-speed serial communication network eliminating long runs of point-to-point wiring.

Unfortunately, high-speed serial communication networks commonly used in industrial control are not sufficiently reliable for safety systems. For this reason, efforts have been undertaken to develop a "safety network" being a high-speed serial communication network providing greater certainty in the transmission of data. Currently proposed safety networks are incompatible with the protocols widely used in industrial control. Accordingly, if these new safety networks are adopted, existing industrial controller hardware and standard technologies may be unusable, imposing high costs on existing and new factories. Such costs may detrimentally postpone wide scale adoption of advanced safety technology.

Furthermore, conventional safety systems transmit redundant messages on two separate hardware paths so as to reduce the problem of hardware failure. If data is being transmitted across networks utilizing different communication protocol, a bridge must be implemented in order to allow the two communication between the networks. In order to make the bridge conform with the requirements of the safety system, it must have to separate hardware paths to process the redundant messages. Conventional bridges include only a single hardware path, and their modification to include a second hardware path is expensive and inefficient. If a conventional bridge with a single hardware path is installed, and one of the components fails, the redundant messages will still match (assuming the failure is persistent) when they are subsequently compared, and the error would go undetected.

What is needed is a safety network that is compatible with conventional industrial controller networks and components. Ideally such a safety network would work with a wide variety of different standard communication protocols and would allow the mixing of standard industrial control components and safety system components without compromising reliability. Additionally, it is desirable to implement a standard bridge having a hardware path that is operable with the redundant messages and that will allow the detection of any errors that reside in the circuitry of the bridge.

BRIEF SUMMARY OF THE INVENTION

The present invention provides a bridge for a control system that has a single hardware path operable to accept and convert messages between a first and second communication protocol while maintaining a high level of safety in the data transmission.

In particular, the control system includes 1) a first communication module transmitting data in accordance with a first communication protocol, 2) a second communication module receiving data in accordance with a second communication protocol; and 3) a bridge disposed between the first and second communication modules to provide an interface therebetween. The bridge includes 1) a first network interface receiving a first and second redundant message from the first communication module, wherein the second message is encoded in a predetermined manner with respect to the first message, 2) a processor converting the first and second messages from the first communication protocol to the second communication protocol, and 3) a second network interface transmitting the first and second converted messages to the second communication module.

The foregoing and other aspects of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

BRIEF DESCRIPTION OF THE DRAWINGS

FIG. 1 is a perspective view of a simplified industrial controller using a standard serial communication network linking a central controller with remote input and output circuits and with a remote configuration terminal, such as may be used in the present invention;

FIG. 2 is a schematic block diagram of the control system of FIG. 1 showing redundant wiring from an input switch to the input circuit of FIG. 1, the input circuits having redundant components such as may process the signals from the input switch to send signals over the communication network to the controller of FIG. 1, the controller having redundant processors to send signals over the communications network to the output circuit of FIG. 1, the output circuit having redundant components to provide outputs to an actuator;

FIG. 3 is a fragmentary view similar to FIG. 2, showing an alternative configuration of the input circuit of FIG. 2 using conventional control input circuits without redundant components;

FIG. 4 is a fragmentary view similar to FIG. 2, showing an alternative configuration of the output circuit of FIG. 2 using conventional control output circuits without redundant components;

DETAILED DESCRIPTION OF THE INVENTION

Figure 5:
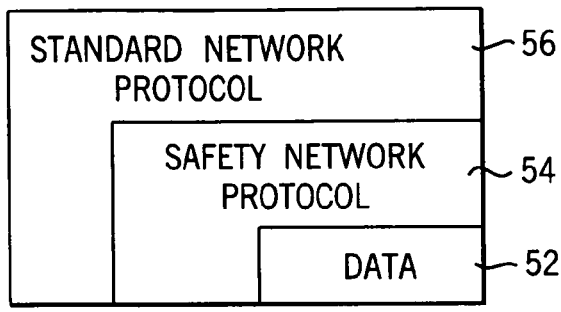
FIG. 5 is a representational view of the dual communication protocols provided by the present invention in which data is first encoded with a safety protocol and then with a network protocol to be compatible with the serial network.

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

Referring now to FIG. 1, an industrial control system 10 for implementing a safety system with the present invention includes a controller 12 communicating on a serial network 15 with remote input module 14 and remote output module 16. The network 15 may be a standard and commonly available high-speed serial network including but not limited to: Ethernet, DeviceNet, ControlNet, Firewire or FieldBus. The network 15 may further include a bridge 17 that is capable of translating between different of the above standard or other protocols. As will be understood from the following, the present invention may be easily adapted to applications that use such a bridge. It should be further understood that while the term "bridge" is used herein, the bridge is intended to encompass a conventional bridge or router as is appreciated by one having ordinary skill in the art.

Input module 14 may accept input signals 18 (on like-designated lines) which are communicated over the network 15 to the industrial controller 12. At the industrial controller 12 the signals 18 may be processed under a control program implementing a safety system (such as a machine lock-out or emergency stop) and further signals sent to the output module 16 which may produce output signals 20 (on like-designated lines) to an actuator 22.

The input signals 18 may come from a switch 19 which may be any of a variety of devices producing safety input signals including but not limited to emergency stop switches, interlock switches, light curtains and other proximity detectors. The actuator 22 may be a relay, solenoid, motor, enunciator, lamp or other device implementing a safety function.

Also connected to the network 15 is a standard computer, which may be used as a configuration terminal 24 whose purposes will be described below.

Redundant System Hardware

Referring now to FIG. 2, the switch 19 may produce redundant signals 18a and 18b where signal 18a is, for example, from a first contact within the switch 19, and signal 18b is from a second independent contact within switch 19. The contacts may have the same logic (as shown) both being normally open (e.g., closed with actuation of a pushbutton 26) or may be inverted logic with one contact normally open and one contact normally closed. In either case, redundant signals 18a and 18b are generated so as to provide for higher reliability in the determining the state of the switch 19.

The input module 14 may include redundant interface circuitry 28a receiving signals 18a and interface circuitry 28b receiving signal 18b. Alternatively, but not shown, interface circuitry 28a and 28b may each receive both signal 18a and 18b (for internal comparison) or may receive signals 18a and 18b from a single contact. The contacts, in generating signals 18a and 18b, may each be provided with a separate voltage from the input circuitry 28a and 28b or from a common voltage source (not shown). Other redundant variations on these wiring systems, known in the art, may also be used.

Each of the interface circuitry 28a and 28b may in turn provide signals to associated microcontrollers 30a and 30b. Microcontrollers 30a and 30b provide a computer processor, memory and a stored program for executing safety protocol programs as will be described below. Alternatively, or in addition, the safety protocol may be executed by safety protocol circuits 32 with which microcontrollers 30a and 30b communicate. In this case, the safety protocol circuits 28a and 28b may be application-specific integrated circuits (ASIC). As it is well known in the art to implement protocols through hardware or software or combinations of each, the term "protocol device" as used herein and in the claims should be understood to embrace generally any combination of software and hardware components implementing the indicated functions.

The microcontrollers 30a and 30b may communicate with each other through an internal bus 34 to compare signals 18a and 18b as will be described.

Microcontrollers 30a and 30b or safety protocol circuits 28a and 28b in turn connect to standard network protocol circuits 36a and 36b of a type well known in the art for handling the low level protocol of the standard network 15. Typically, the standard network protocol circuits 36a and 36b are implemented by an ASIC whose implementation represents considerable development time and which cannot be easily modified.

The standard network protocol circuits 36a and 36b transmits signals from the input module 14 on the network 15 to be received at the controller 12 through a similar standard network protocol circuits 38a and 38b. These signals are processed by the standard network protocol circuit 38 and provided to redundant safety protocol circuits 40a and 40b, being similar to safety protocol circuits 32a and 32b described before. These safety protocol circuits 40a and 40b communicate with processors 42a and 42b, respectively, which include separate memory systems and control programs according to well-known redundancy techniques and which intercommunicate on internal bus 34'. Output signals generated by the processors 42a and 42b may be communicated back through the safety protocol circuits 40a and 40b to implement the safety protocol, as will be described below (or alternatively, the safety protocol may be handled by the processor 42a and 42b), and the output signals communicated to the standard network protocol circuits 38a and 38b for transmission again on network 15 to output module 16.

Output module 16 may receive output data through a standard network protocol circuit 44 and 44' being similar to standard network protocol circuits 36a and 36b and 38a and 38b. The standard network protocol circuits 44 and 44' provide the data to safety protocol circuits 46a and 46b, which in turn provide them to redundant controllers 48a and 48b. As before, alternatively, the safety protocol may be handled by the controllers 48a and 48b instead. The controllers 48a and 48b communicate by internal bus 34" and in turn provide signals to output interface circuits 50a and 50b which provide the output signals 20a and 20b. The output signals may be connected to the actuator 22 so that outputs must be enabled for the actuator 22 to be powered. In this sense, a default safety state is produced (of no power to the actuator 22) if there is an inconsistency between the signals received by processors 48a and 48b. A change in the wiring to parallel configurations could create a safety state where the actuator is actuated unless both signals received by processors 48a and 48b are not enabled.

Alternatively, and as will be described, a safety state may be enforced by a safety state signal transmitted from the controller 12 or the input module 14 to the microcontrollers 48a and 48b of output module 16, the latter which may respond by producing outputs to output interface circuits 50a and 50b determined by stored values of desired safety states programmed through the configuration terminal 24 as will be described further below.

A bridge circuit 17 per the present invention could use the basic structure shown in the input module 14 but replacing the interface circuitry 28a and 28b of input module 14 with network protocol circuits 38a and 38b and safety protocol circuits of 40a and 40b (where the network protocol circuits 38 and 36 are for different protocols, thereby allowing seamless transmission of safety data per the techniques described below).

Referring now to FIGS. 19–23, an alternate embodiment is illustrated (hereinafter referred to as the "reduced hardware embodiment") and provides redundant transmission of safe messages while decreasing the amount of hardware necessary for the control system 10. In particular, the pair of network protocol circuits may be replaced by a single circuit that handles communication for both redundant messages. Diversity is achieved first by decoding one of the messages in a predetermined manner with respect to the other message prior to transmission through the network protocol circuit. The encoded data is subsequently decoded after the data has passed through the network protocol circuit, and both messages are compared to ensure that no systematic errors exist in the circuitry. For example, if an error in the protocol circuit systematically alters both messages, then the data on the two messages will not subsequently match once the encoded message is decoded, as will now be described with reference to FIGS. 19–24. It should be appreciated, however, that while "first" and "second" messages are described herein, the invention is not to be limited to two separate messages. Instead, a single message may contain two logical messages that are processed by a single processor in accordance with the present invention, as will become more apparent from the description below.

The numbering of each element in FIGS. 19–24 corresponding to like elements of FIGS. 2–4 have been incremented by 200 for the purposes of clarity and convenience. In accordance with the reduced hardware embodiment, encoding is achieved by inverting each bit of data by a predetermined one of the microprocessors in modules 212, 214, and 216 such that one message contains the safety data, while the other message contains the inverse of that data. Following each inversion process at each module, the encoded message is decoded by uninverting the data. The decoded data is then compared to the other message to ensure integrity. All data transmitted in accordance with this embodiment may be constructed in conformance with the safety protocol described throughout the present invention.

Figure 19:
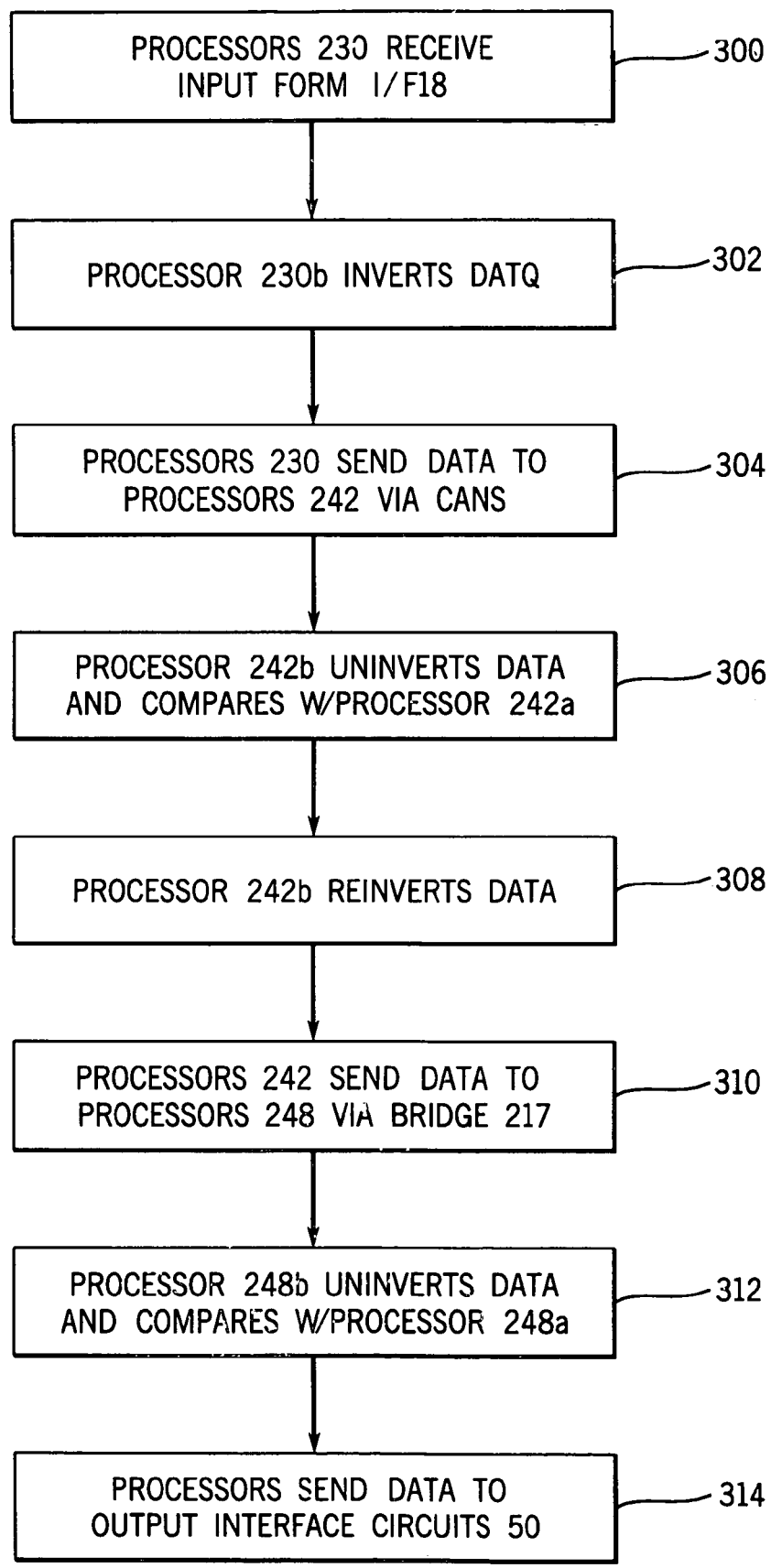
FIG. 19 is a flow chart of steps performed in accordance with an alternate embodiment of the invention.
Figure 20:
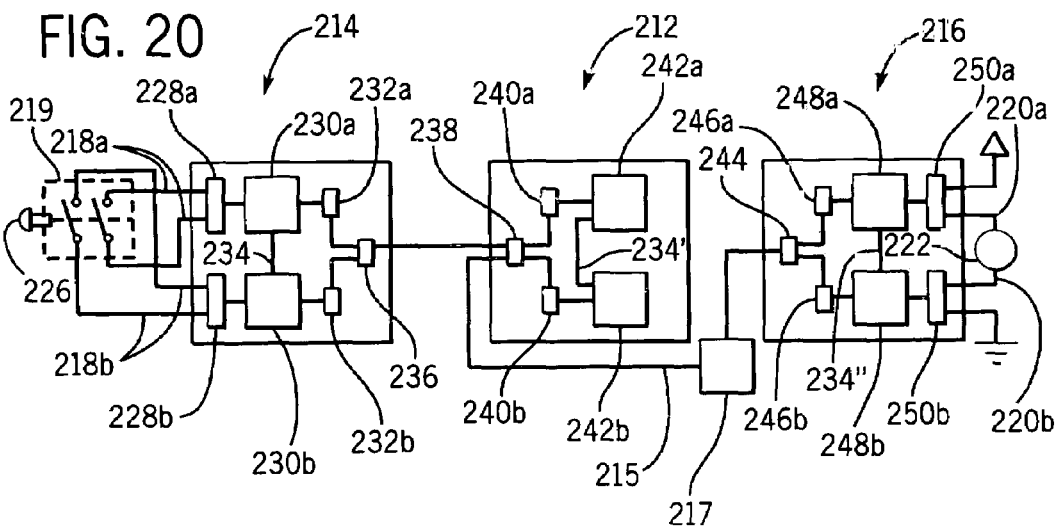
FIG. 20 is a schematic block diagram of a control system in accordance with the alternate embodiment described in FIG. 19.
Figure 21:
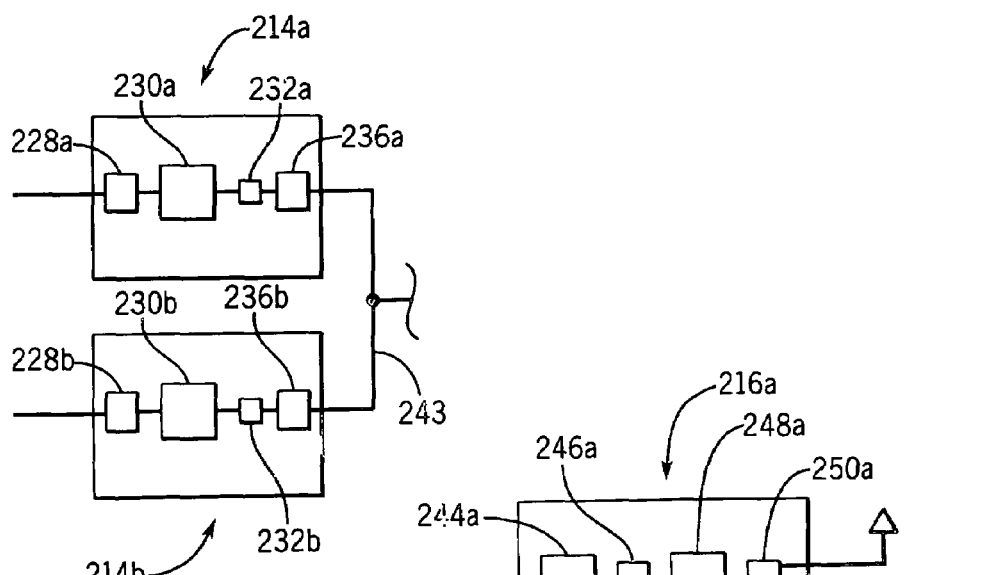
FIG. 21 is a fragmentary view similar to FIG. 20, showing an alternative configuration of the input circuit of FIG. 20 using conventional control input circuits without redundant components.

Referring now to FIGS. 19–21 in particular, redundant signals 218a and 218b are transmitted by switch 219 on two messages, and are subsequently received by interface circuitry 228a and 228b, respectively, of the input module 214. The interface circuitry then transmit signals to the appropriate microprocessor 230a and 230b at step 300. A predetermined one of these microprocessors, for example microprocessor 230b compares its message to that received by microprocessor 230a to ensure the accurate transfer, and then inverts its data at step 302 while the data received by microprocessor 230a remains unaltered. The data is then sent through the appropriate safety protocol circuit 232a and 232b, as described above, to execute the safety protocol. The reduced hardware embodiment further implements a Controller Area Network (CAN) controller and associated transceiver, identified collectively at 236, that routes the data packets to the appropriate CAN 238 of controller 212. CANs thus route both messages to their proper destination on the network, and reduce the amount of circuitry necessary as compared to those systems that employ a separate network protocol circuit for each message. This embodiment thus permits redundancy in the data transfer without the need to employ two separate network protocol modules, as will now be described.

CAN 236 transmits both messages of data to CAN 238 located in control module 212, which routes the inverted message to a predetermined one of processors 242, and routes the unaltered data packet to the other processor at step 304. Assuming that the inverted data is routed to processor 242b, the processor uninverts the data and compares the uninverted data with the data received by processor 242a at step 306. If the two messages match, processor 242b then reinverts the decoded data at step 308, and processes and transmits the data via CAN 238 to the network protocol circuit 244 of output module 216. Protocol circuit 244 could be a CAN, or could operate a different protocol, such as Ethernet. If an error exists in either of the CAN modules, the two messages will not match, and the processor may revert to a safety state, as described above. It should be appreciated that the data may further transmitted from control module 212 to output module 216 via bridge 217, which facilitates data transfer between networks operating different standards or protocols, as described above. However, the bridge 217 may provide an interface between two communication modules operating under the same protocol. Advantageously, the bridge is not involved in the encoding and subsequent decoding of the messages, nor is it necessarily even aware that two redundant messages are being passed between modules 212 and 216. Bridge 217 merely receives data in a first protocol, and transmits the data in the same protocol in situations where modules 212 and 216 are operating under the same protocol. Alternatively, in situations where modules 212 and 216 operate under different communication protocol, bridge 217 receives data in a first protocol from module 212, converts the data into a second protocol for use by module 216, and transmits the data.

Protocol circuit 244 then transmits both messages to respective processors 248a and 248b via safety protocol circuits 246a and 246b at step 310. Processor 248b uninverts the inverted message and compares with the message received by processor 248a at step 312 to ensure the successful data transmission. If, at any point in the data transfer, an inconsistency exists between the uninverted message and the unaltered message, a default safety state is produced (of, for example, no power to the actuator 222). Alternatively, depending on the function of actuator 222, the control process may be shut down if an inconsistency in the messages is detected. The messages are then sent over output interface circuits 250a and 250b at step 312, which provide the output signals 220a and 220b to actuator 222. It is easily appreciated that, while each of modules 212, 214, and 216 include independent safety protocol circuits for each message, the respective microprocessor could be configured to format the messages to include safety protocol, as described in more detail below, thus dispensing with the safety protocol circuits and reducing the necessary hardware components of the control system.

Figure 6:
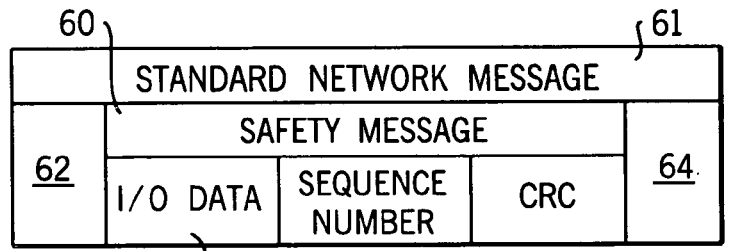
FIG. 6 is a schematic representation of a data word transmitted over the standard serial network showing the embedding of safety formatting data with I/O data within the formatting provided by the standard serial network.
Figure 23A:
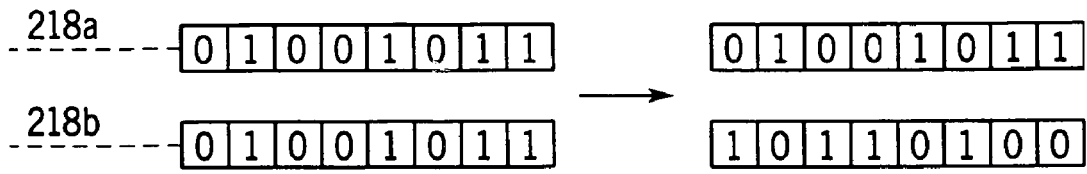
FIG. 23A–C are illustrations of data altering techniques performed in accordance with the alternate embodiment illustrated in FIGS. 19–22.

It should further be appreciated that, while the messages are inverted in accordance with the preferred embodiment, other reversible data manipulation techniques may be performed in accordance with the present invention. Examples of various data manipulation techniques are illustrated with reference to FIGS. 23A–C. FIG. 23A illustrates the above-described inversion process. In particular, two messages that are received from lines 18a and 18b may be transferred to modules 214, 212, and 216. In doing so, one of the messages (message b as illustrated) is inverted. In particular, each bit of data on the message, including the header 62, I/O data 52, safety error detection data 58, and footer 64, as will be described below with reference to FIG. 6, are all reversed. As a result, the inversion is usable in combination with a message that includes a cyclic redundancy code to enable two levels of safety. While the data comprises eight bits in accordance with the illustrated embodiment, any number of bits may be used. It should be further easily appreciated that the data could comprise I/O data, as described herein in accordance with the preferred embodiment. However, the present invention is not intended to be so limited. For instance, the data could alternatively comprise peer to peer data, in which each party has the same capabilities, and either party can initiate a communication session.

Figure 23B:
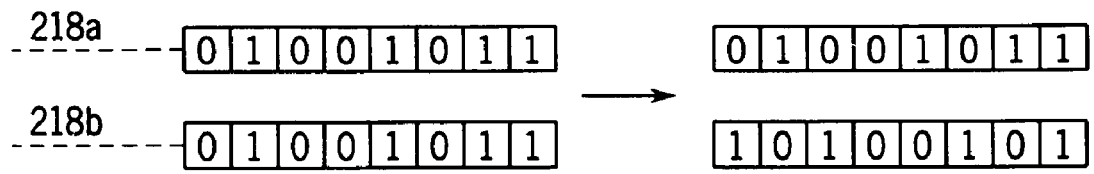
Figure 23C:
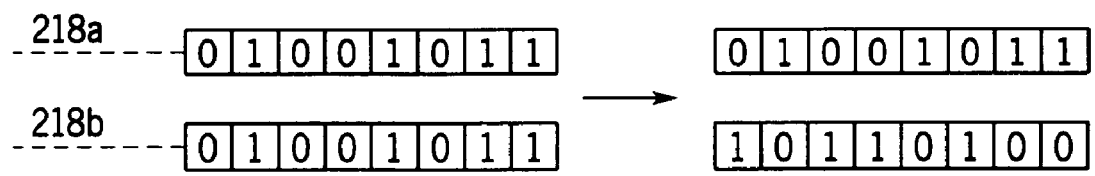

Referring to FIG. 23B, the messages may alternatively be decoded with respect to each other by shifting the data a predetermined number of positions on one of the messages. In accordance with the illustrated embodiment, each bit of data is shifted one position to the right, with the last bit being wrapped around to the first bit. This data manipulation technique may be decoded by shifting each bit of data in message b to the left to verify the data with that of message a. FIG. 23C illustrates yet another data manipulation technique for 8 bits of data, in which the position of the first half (first 4 bits for an 8 bit word) of the data is translated to the position of the second half (last 4 bits), and vice versa. This process is also reversible when comparing the two messages to ensure the data integrity.

While it is envisioned that the encoding may be achieved by virtually any reversible data manipulation technique in accordance with this embodiment, the inversion process ensures that each bit of the manipulated data will be different than the corresponding bit of the unaltered data. As a result, the integrity of each bit of data may be verified. It should further be appreciated, however, that both messages may be manipulated in accordance with the invention. For example, the first half of one message may be inverted while the second half of the other message may be inverted. Accordingly, any predetermined reversible data manipulation technique of one redundant message with respect to the other that may subsequently be decoded falls under the scope of the present invention.

Figure 24:
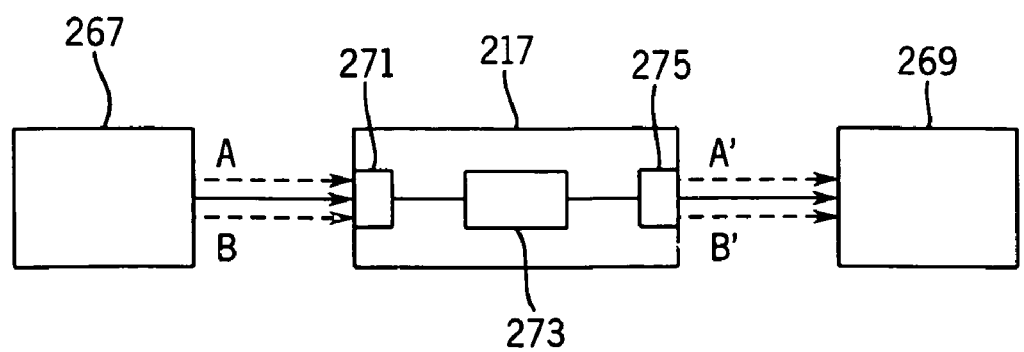
FIG. 24 is a schematic diagram of a bridge constructed in accordance with the alternate embodiment illustrated in FIGS. 19–23.

Referring now to FIG. 24, the communications system utilizing the preferred embodiment may include a bridge 217 disposed between two communications modules to allow communication of data between a first and second protocol which may be the same or different, as described above. Advantageously, the bridge 217 is equipped only with standard circuitry, including a first network interface 271, e.g. CAN, receiving data from producer 267 operating a first protocol; a microprocessor 273, and a second network interface 275, e.g. Ethernet, transmitting the received data on a second protocol to the consumer 269. As is understood by those having skill in the art, data originates from a "producer" of data, and is received by a "consumer" of the data. However, generally the bridge is bi-directional and the positions of the producer and consumer may be reversed. Even though the bridge includes only a single hardware path, redundancy is nonetheless achieved due to the data manipulation technique described above. Accordingly, bridge 217 may be used to permit communication between the input module 214 and controller module 212, or between controller module 212 and output module 216, or between any other devices that communicate under different protocol, as understood by those having ordinary skill in the art.

In accordance with the reduced hardware embodiment, the producer 267 transmits redundant data on messages A and B, one being inverted with respect to the other as described above. The messages are received by network protocol circuit 271, and are transferred to microprocessor 273, which converts both messages to the communication protocol of consumer 269. The two messages are then transmitted to consumer 269 via network interface 275. The integrity of the data of the two messages is subsequently examined in the microprocessor of the consumer 269 by uninverting the inverted message and comparing it to the other message, as described above. If an error exists in the circuitry of the bridge, such that any bits of data in either or both of the messages are altered, then the two messages will not compare satisfactorily and the data may assume a safety state.

For example, if the first bit of each message is "1", then the first bit of the inverted message will be "0" and subsequently "1" once again when it is uninverted. The two messages will then compare satisfactorily. However, if circuitry in the bridge systemically alters the first bit of each message to "0" after inversion of one of the messages, then the first bit of the inverted message will be "1" when it is uninverted. The first bit of the two messages subsequently will not match upon comparison, and the data will assume a safety state.

Referring now to FIG. 3, specialized redundant input module 14 illustrated in FIG. 2 may be replaced with two standard input modules 14a and 14b, input module 14a holding the equivalent of previously described interface circuitry 28a, microcontroller 30a, safety protocol circuit 32a and standard network protocol circuit 36a; and input module 14b holding the equivalent of interface circuitry 28b, microcontroller 30b, safety protocol circuit 32b, and standard network protocol circuit 36b. In this case, the operation of safety protocol circuits 32a and 32b are implemented in the firmware of the microcontrollers 30a and 30b and effected via messages communicated on the network 15 rather than the internal bus 34.

Likewise, referring now to FIG. 21, the specialized redundant input module 214 illustrated in FIG. 20 may be replaced with two standard input modules 214a and 214b, input module 214a holding the equivalent of previously described interface circuitry 228a, microcontroller 230a, safety protocol circuit 232a and standard network protocol circuit 236a; and input module 214b holding the equivalent of interface circuitry 228b, microcontroller 230b, safety protocol circuit 232b, and standard network protocol circuit 236b. In this case, the operation of safety protocol circuits 232a and 232b are implemented in the firmware of the microcontrollers 230a and 230b and effected via messages that are communicated on the network 215 rather than the internal bus 234.

Referring to FIG. 4, the redundancy of output module 16 may be implemented by separate output circuits 16a and 16b, output module 16a including the equivalent of standard network protocol circuit 44, safety protocol circuit 46a, microcontroller 48a, and output interface circuit 50a, with output module 16b including the equivalents of standard network protocol circuit 44 as 44b, safety protocol circuit 46b, microcontroller 48b, and output interface circuit 50b. As will be described below, the present invention provides a protocol that is indifferent to the exact parsing of the safety components among physical devices having addresses on the network 15

Figure 22:
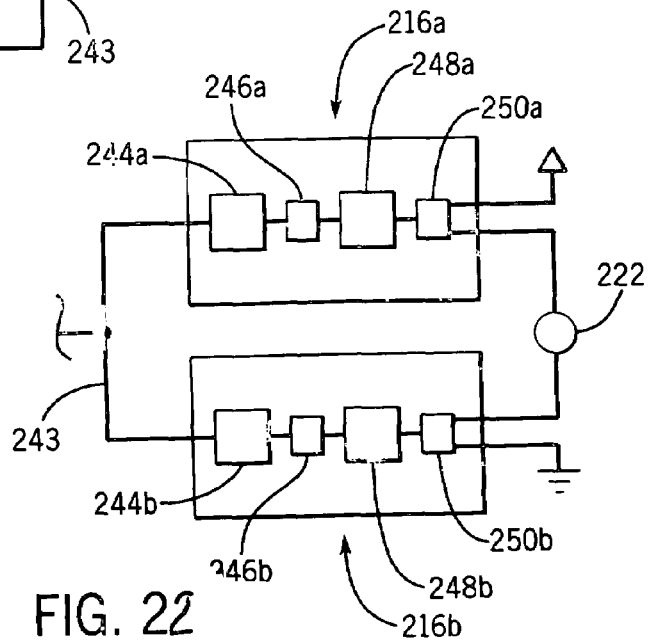
FIG. 22 is a fragmentary view similar to FIG. 20, showing an alternative configuration of the output circuit of FIG. 20 using conventional control output circuits without redundant components.

Likewise, referring now to FIG. 22, the redundancy of output module 216 may be implemented by separate output circuits 216a and 216b, output module 216a including the equivalent of standard network protocol circuit 244, safety protocol circuit 246a, microcontroller 248a, and output interface circuit 250a. Output module 216b includes the equivalents of standard network protocol circuit 244 as 244b, safety protocol circuit 246b, microcontroller 248b, and output interface circuit 250b. As will be described below, the present invention provides a protocol that is indifferent to the exact parsing of the safety components among physical devices having addresses on the network 215.

In accordance with the embodiments illustrated in FIGS. 3 and 21, communication between modules 14a and 14b, and 214a and 214b is accomplished over links 43 and 243, respectively, that connect network protocol circuits 36a and 36b, and 236a and 236b, respectively. In accordance with the embodiments illustrated in FIGS. 4 and 22, communication between modules 16a and 16b, and 216a and 216b is accomplished over links 43 and 243, respectively, that connect network protocol circuits 44 and 44'b, and 244a and 244b, respectively.

Referring now to FIGS. 5 and 2, the operation of the safety protocol circuits 32 and standard network protocol circuits 36 in the input circuit is to embed input data 52 from lines 18b within a safety-network protocol 54 implemented both as additional data attached to messages sent on network 15 and in the management of that data as will be described. The safety-network protocol 54 is in turn encapsulated in the standard network protocol 56 for seamless transmission on the network 15.

The Safety Network Protocol

Referring now to FIGS. 5 and 2, the operation of the safety protocol circuits 32, 40 and 46 in conjunction with the standard network protocol circuits 36, 38 and 44 is to embed I/O data 52 (e.g., from lines 18b) within a safety-network protocol 54 implemented both as additional data attached to I/O data 52 sent on network 15 and in the management of the particulars of transmission of that I/O data 52. The safety-network protocol 54 is in turn encapsulated in the standard network protocol 56 for seamless transmission on the network 15.

The data encapsulated in the safety-network protocol 54 and standard network protocol 56 can then be received (e.g., by the controller 12) and extracted through the successive operation of the standard network protocol circuits 36, 38 and 44 and the safety protocol circuits 32, 40 and 46 to provide the I/O data 52 in its basic state. Note that FIG. 5 is only symbolic of the process and that the safety-network protocol 54 is not simply an encapsulation of the data 52 within for example safety data headers but rather the safety protocol includes timing constraints that may be executed in sequence with the standard network protocol 56 so that the safety-network protocol 54 may operate within the standard network protocol 56 without modification of the network 15 or standard network protocol circuits 36, 38 and 44.

This dual level encapsulation and de-encapsulation is performed for each transmission of I/O data 52 on the network 15 that requires a high level of reliability commensurate with safety systems. For non-safety system data, the standard network protocol 56 may be used alone without the safety-network protocol 54 for communication with non-safety elements of the industrial control system 10. Because all data transmitted on the network 15 is embedded in the standard network protocol 56, the safety-network protocol 54 will work seamlessly with a variety of networks 15 providing they have data transmission capacity suitable for the I/O data 52 and sufficient in capacity to accept some added safety error detection data 58 of the safety-network protocol 54 as will be described.

Safety Message Formatting

Referring now to FIG. 6, a first aspect of the safety-network protocol 54 is that the I/O data 52 is attached to safety error detection data 58 to form a safety message 60 that forms the data provided to the standard network protocol circuits 36, 38 and 44 to produce a network message 61. The safety error detection data 58 may include a sequence count indicating the local order in which the safety message 60 is transmitted with respect to earlier transmissions of safety messages. The sequence count is normally limited in range (0–3) as it is intended, as will be described, to detect the loss of only a single message.

Also appended to the I/O data 52 and part of the safety error detection data 58 is a cyclic redundancy code (CRC) selected in the preferred embodiment to be twelve-bits. The cyclic redundancy code is functionally generated from the I/O data 52 and the sequence count so that an error in the transmission of either of those data elements can be detected when the CRC is recalculated by the receiving device and doesn't match. As is understood in the art, a twelve bit error code will allow the detection of errors with odd numbers of bit errors, all two-bit errors, all burst errors up to twelve bits and 99.951% of burst errors larger than twelve bits, for up to two-thousand and forty seven bits of data of the safety message 60.

The safety message 60 is embedded in the network headers and footers 62 and 64, which vary depending on the standard network protocol 56 of the network 15. Depending on the network 15, the network header and footer 62 and 64 may include a CRC code and sequence count and other similar safety error detection data 58 operating redundantly with the safety error detection data 58. Nevertheless, the safety message 60 includes its own safety error detection data 58 so as to be wholly network-independent to the degree possible.

Connected Messaging

Figure 9:
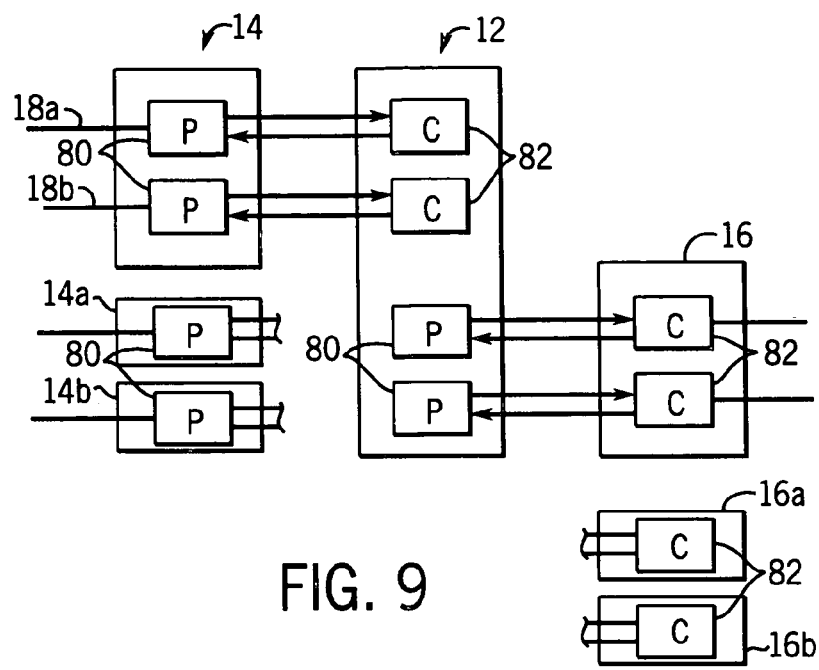
FIG. 9 is a block diagram of the industrial controller of FIG. 1 showing the division of communications between the input circuit, the controller and the output circuit into producer-consumer pairs such as provides redundant communication over a single network and the varied topologies of the implementations of FIGS. 2, 3 and 4.

As mentioned above, the safety error detection data 58 forms only part of the safety-network protocol 54. The safety-network protocol 54 also includes a configuration step that ensures proper communication under a connected messaging scheme. Referring now to FIG. 9, the communications between the controller 12, input module 14 (or input modules 14a and 14b) and the output module 16 (or output module 16a and 16b) may provide a connected messaging system. As is understood in the art, connected messaging involves opening a connection between pairs of logical devices one that acts as a "producers" of a message and one that acts as a "consumers" of the message. The process of opening the connection reserves bandwidth of the network and reserves necessary processing and buffering resources at the producer and consumer to ensure that data of the connection will be reliably transmitted and received.

The connected messaging protocol may be implemented as part of the safety network protocol 54 or as part of the standard network protocol 56, the latter option limiting somewhat the types of standard networks 15 that may be used. Some standard network protocols that support connected messaging are DeviceNet and Control Net, Ethernet, and ATM.

Referring now to FIG. 9, under a connected messaging protocol, the input module 14 provides two producers 80 opening two connections with two consumers 82 of the controller 12, one for each of the signals 18a and 18b. As a practical matter, these two connections mean that two separate network messages 61 will be sent over the network 15 thus decreasing the chance of loss of both messages.

For the implementation of FIG. 3 with separate input module 14a and 14b, two producers 80 are also provided. Even though the producers 80 are now in different devices (having different addresses on the network 15), the operation of the control program implementing the safety system, above the connection level, need not changed by these changes in implementations. Connected messaging thus makes the safety system largely indifferent to topologies as providing for a natural redundancy over a single network, or bridging or routing across multiple links Controller 12 likewise includes two producers 80 exchanging data with consumers 82 either in a single output module 16 per FIG. 2 or in separate output module 16a and 16b per the embodiment of FIG. 4. Two arrows are shown between each producer 80 and consumer 82 indicating the paring of each message with an acknowledgment message under the safety protocol 54 as will be described below, per FIG. 9.

The bridge circuit 17, not shown in FIG. 9, but as described above, would implement four consumers and four producers (two for each network side) as will be understood to those of ordinary skill in the art.

Safety Configuration Data and Protocol

Figure 10:
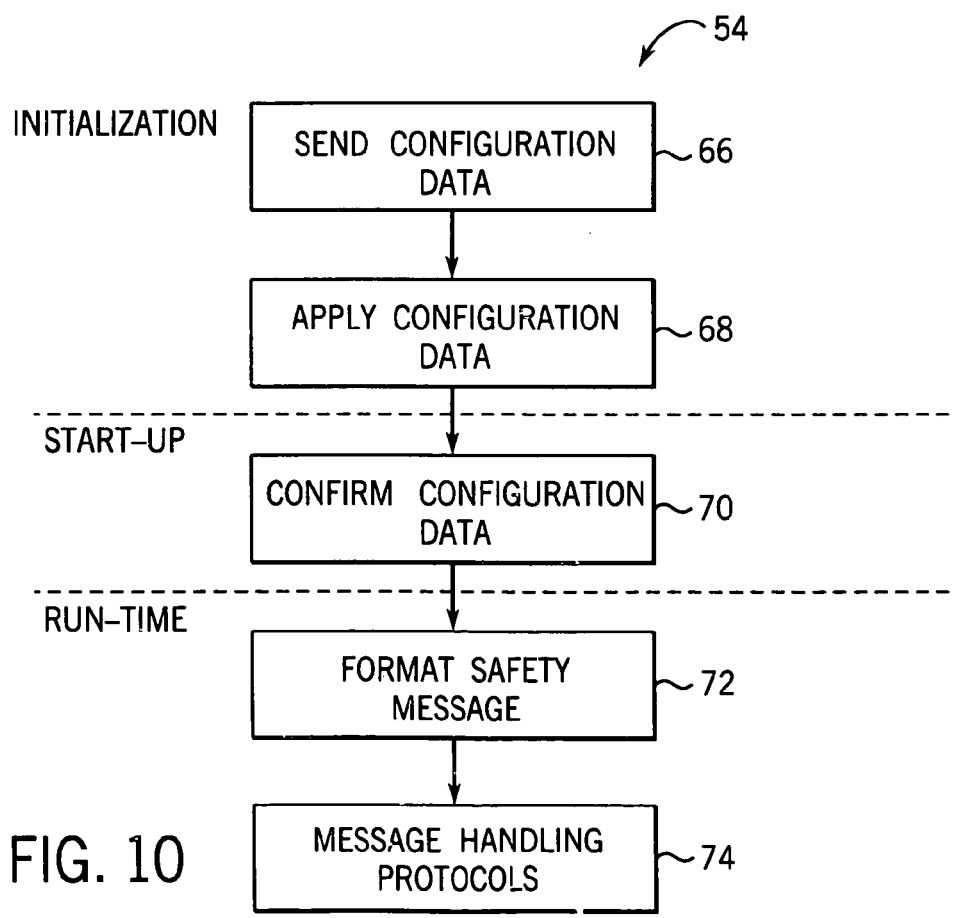
FIG. 10 is a flow chart showing the principle stages of the safety protocol of initialization, start-up, and run-time.

Referring now to FIG. 10, the safety protocol more generally includes an initialization state, of which the first step is developing configuration data as indicated by process block 66.

The configuration process involves developing configuration data at the configuration terminal 24 and ensuring that accurate copies of that configuration data are at each of the input module 14, the controller 12, and the output module 16. The configuration data is unique to each connection, provides essential components of the safety protocol, and identifies intercommunicating parties so as to reduce the possibility of improper connections injecting spurious data into the safety system. This is particularly important in allowing mixing of systems components observing the safety network protocol 54 with standard components observing only the standard network protocol. Devices may support multiple connections, in which case multiple configuration data specific to each connection will be used.

Generally, the configuration data include data uniquely identifying the particular device of the input module 14, the controller 12, and the output module 16 holding the configuration data, and particularly the serial number of that device. The serial number is a unique and immutable part of the physical devices and thus together with an internal address of the logical devices within the physical device (which may establish independent connections) the serial number provides each connection with a unique identity eliminating the possibility of crossed connections between different devices once the configuration data is properly disseminated. To augment the serial number, the configuration data may also include a vendor identification number, a device code, a product code, major revision, minor revision, as well as network data including the logical, physical address of the device, all known in the art and identifying the particular device. Similarly, the configuration data within a device may include the serial number of the device to which it is connected.

As mentioned, the connection data may also include data necessary for the implementation of the other aspects of the safety protocol as are yet to be described, including variables of "periodic time interval", "reply timer interval", "filter count", and "retry limit". The configuration data also includes the safety state to which the device will revert in the case of network error and a list of related I/O points indicating other I/O points (related to other connections), which should revert to the safety state if the present connection has an error. This later feature allows selective and intelligent disabling of the safety system upon a communication error as will be described. As will be evident from context, some of this data, for example, data related to how particular devices should respond to a failure of any one device (e.g., the list of related I/O points, is dependant on the devices and their application and the system programmer must develop this data on an application specific basis.

Figure 7:
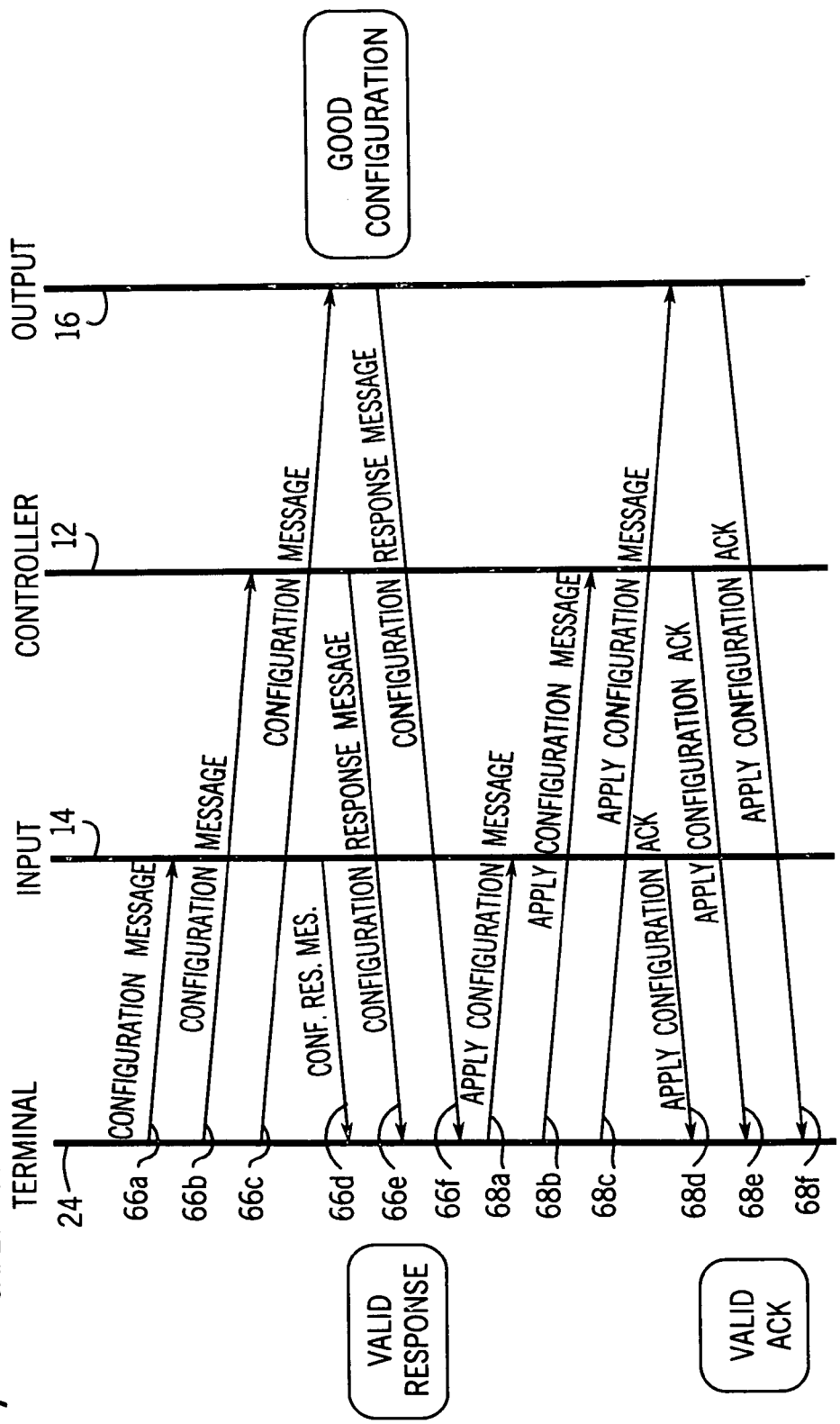
FIG. 7 is a graphical representation having time on the vertical axis and distance along the network on the horizontal axis, showing transmission of configuration messages to the input circuit, the controller and the output circuit, forming the foundation of the safety protocol of the present invention.

Referring to FIG. 7, configuration data held within the configuration terminal 24 is sent to each of the input module 14, the controller 12, and the output module 16 as messages 66a, 66b and 66c. In accordance with the reduced hardware embodiment, the configuration data will further indicate which controller in each module that is responsible for uninverting the data, and comparing the uninverted data to the unaltered data.

The receiving input module 14, the controller 12, and the output module 16 store the configuration and respond with the same configuration message but changed to a one's complement form (being simply a different binary coding (the inversion)) of the configuration data received. This one's complement message is returned by messages 66d, 66e, and 66f from the respective input module 14, the controller 12, and the output module 16. If the configurations of messages 66a, 66b and 66c exactly match (after complementing) configuration data of messages 66d, 66e and 66f, the configuration was successful.

The configuration data may be shown to a human operator for confirmation. If the operator finds that the configuration is correct, the configuration is applied as indicated by process 68 shown in FIG. 10 through messages 68a, 68b and 68c from the configuration terminal 24 to the respective input module 14, the controller 12, and the output module 16. The devices must acknowledge these messages via messages 68d, 68e and 68f within a predetermined time interval or the configuration will be cleared and no configuration will be considered to have occurred. The configuration data of messages 66 and 68 may be sent using only the standard network protocol 56.

Figure 8:
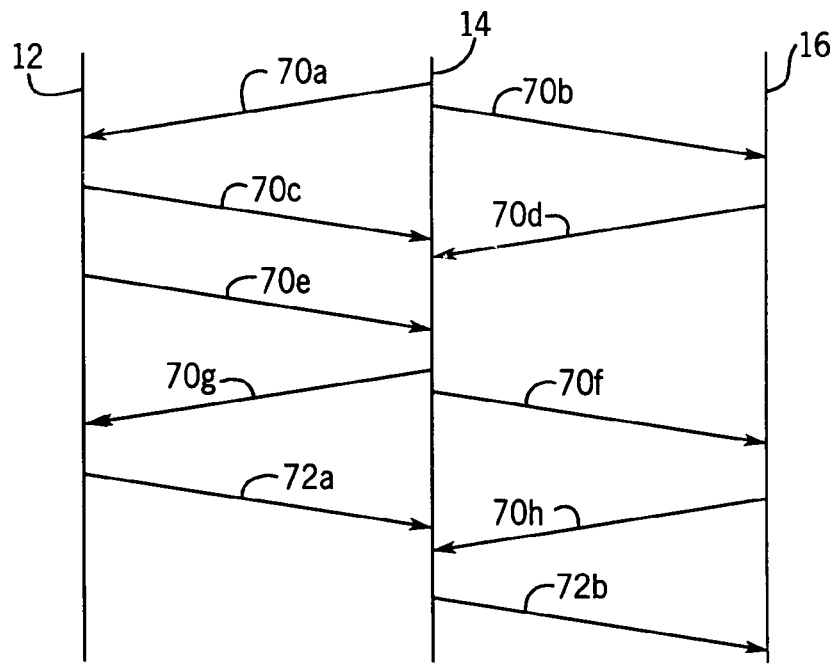
FIG. 8 is a figure similar to that of FIG. 7 showing the transmission of messages after the configuration process during a start-up and run-time phase of the network.

Once the configuration is complete, the safety protocol enters a start-up phase shown generally in FIGS. 8 and 10. During the start-up phase, the necessary safety connections are established and the configuration data is used to verify that the connections expected are those which are in fact made. The purpose of the start-up portion of the configuration is to prevent erroneous connections from being opened between: (1) devices in the safety system and other erroneous devices in the safety system, and (2) devices in the safety system and other devices not in the safety system in a mixed system.

In this start-up process, indicated by process block 70 of FIG. 10, the connections are confirmed from the controller 12 to the input module 14 and the output module 16. In particular, the producers 80 in controller 12 (shown in FIG. 9) send out open connection messages 70a and 70b to the input module 14 and the output module 16, respectively. The appropriate consumers 82 respond with connection acknowledgment message 70c and 70d, respectively. The producers 80 in controller 12 and input module 14 then send the configuration data to the consumer 82 in the controller 12 as indicated by messages 70e and 70f. The controller's consumers 82 check to see that the configuration data matches their configuration data and then send acknowledgment messages 70f and 70g acknowledging that match. At messages 72a and 72b, conventional I/O data may then commence to be sent.

Referring again to FIG. 10, the data 72a and 72b will be transmitted according to the portions of the safety protocol indicated by process blocks 72 involving formation of the safety message 60 incorporating safety error detection data 58 into the network message 61 as has been described above, and according to message handling protocols 74 operating independent of and in conjunction with the content of the safety message 60 which will now be discussed.

Message Handling Safety Protocols (1) Normal Transmission

Figure 11:
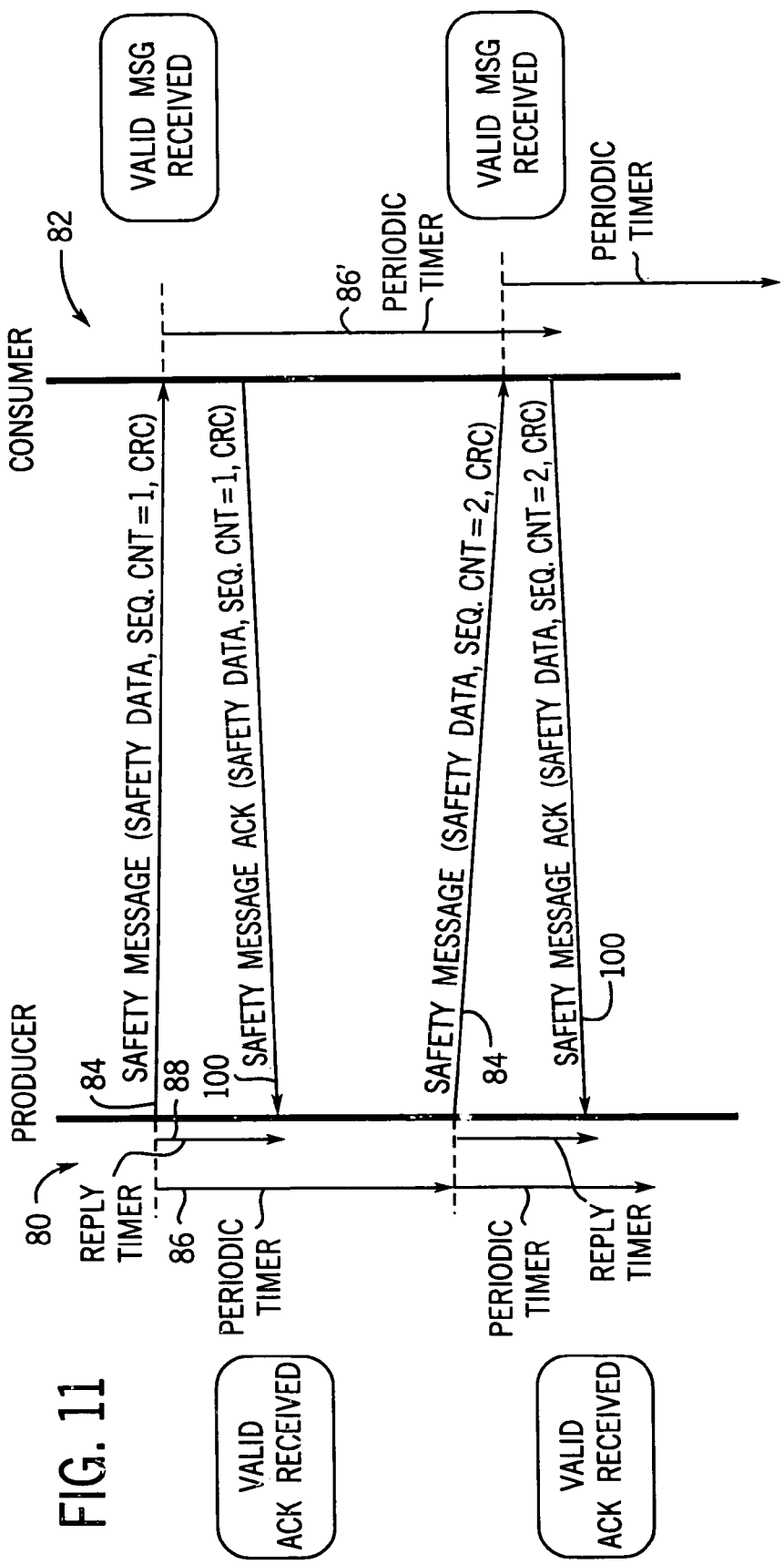
FIG. 11 is a figure similar to that of FIG. 7 showing normal protocol operation under the safety protocol of the present invention during run-time.

Referring generally to FIGS. 10 and 11, the message handling protocols 74 provide for message time measurements and respond to errors in the safety error detection data 58 during run-time. These message-handling protocols 74 are implemented in the safety protocol circuits 32, 40 and 46 or may be implemented in software and are different for producers and consumers.

Figure 17:
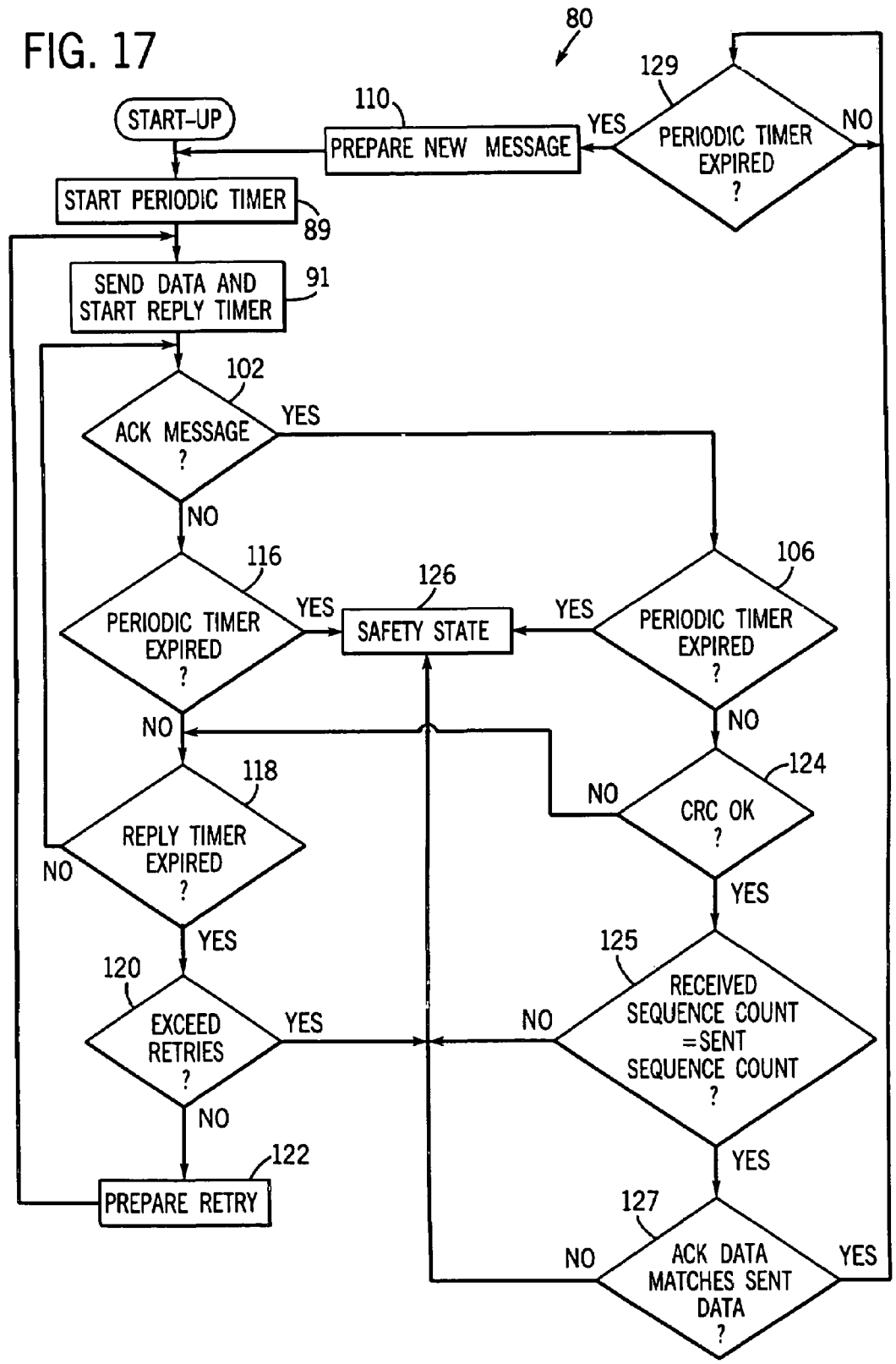
FIG. 17 is a flow chart of a program executed by the producers of FIG. 9 in implementing the safety protocol.

Referring now to FIGS. 11 and 17 for a normal, run-time transmission, the producer 80 upon run-time will send safety messages 84 (encapsulated in the standard network message 61 per safety message 60 as has been described above) to the consumer 82 per FIG. 11. This sending is indicated generally in FIG. 17. Immediately prior to sending the message 84, a periodic timer is started per process block 89 and a reply timer is started at the moment the message 84 is transmitted per process block 91. The periodic timer interval 86 is longer than the reply timer interval 88 as set in the configuration process described above.

Figure 18:
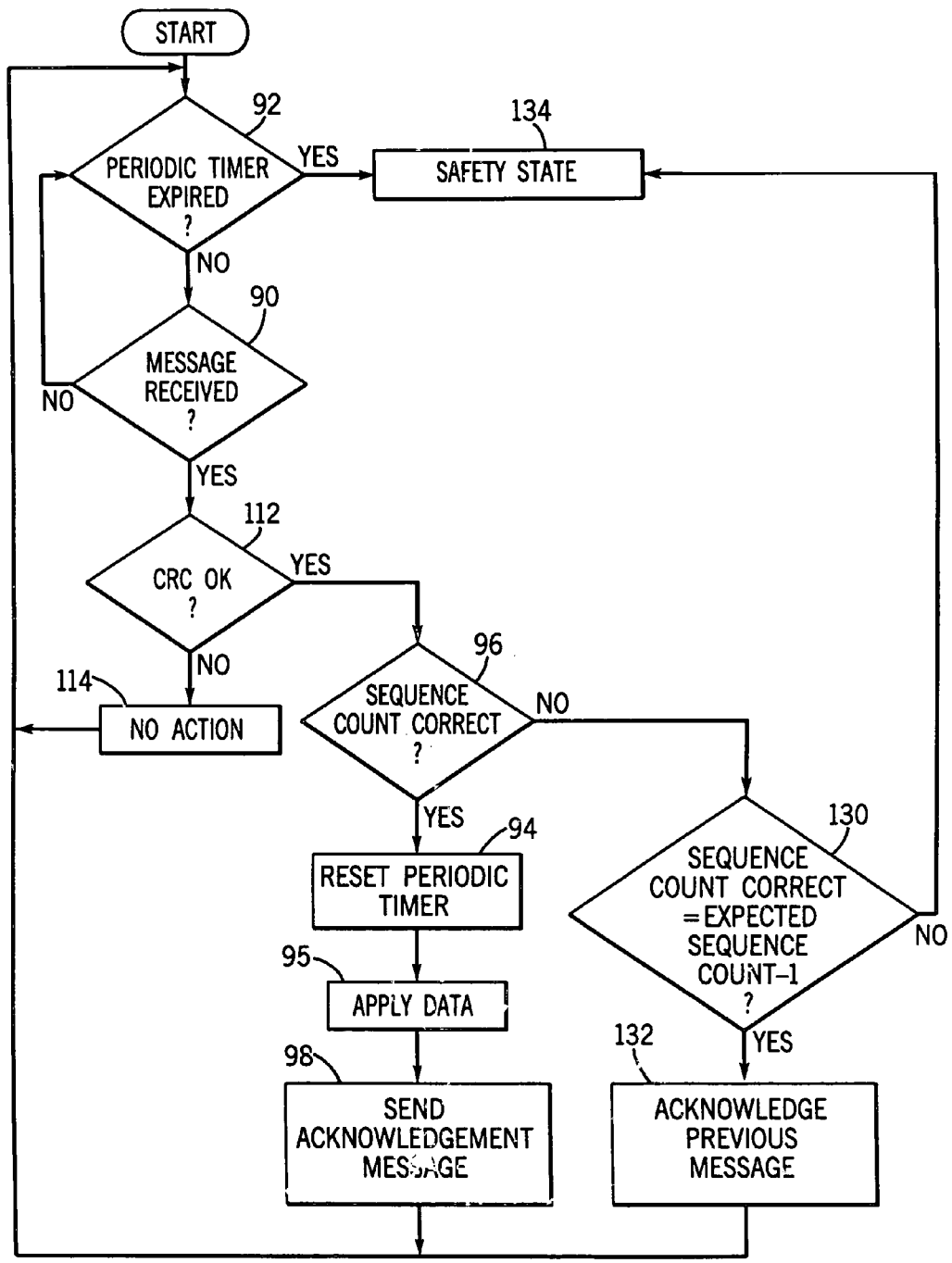
FIG. 18 is a flow chart of a program executed by the consumers of FIG. 9 in implementing the safety protocol of the present invention.

Referring now to FIGS. 9, 11 and 18, the consumer 82 prior to receiving the message 84 is continually checking to see if the periodic time interval 86' of its own periodic timer (started at the consumer's receipt of the last message 84) has expired as indicated in decision block 92. The periodic timer value 86' is generally greater than periodic timer value 86.

If the periodic timer has expired, a failure is indicated and the program proceeds to process block 134, a safety state, as will be described below.

If timer value 86 has not expired, then at decision block 90, the consumer 82 checks to see if the message 84 has arrived. If no message 84 has arrived the program proceeds back to decision block 92 to again check if the periodic timer 86 has expired.

Assuming that a message 84 has arrived prior to expiration of the periodic timer 86, then the program proceeds to decision block 112 to check the CRC of the message 84.

Assuming that the CRC is correct, the program proceeds to decision block 96 and checks to make sure that the sequence count is one greater than the sequence count of the last message received.

If the sequence count is correct, then the program proceeds to process block 94 and the periodic timer 86 is reset. At process block 95, the data is applied, for example, to an output or to update variables, and then at process block 98, an acknowledgment message 100 is returned to the producer 80.

Referring again to FIG. 17, the producer 80 receiving the acknowledge message at decision block 102, proceeds to decision block 106 to determine if the periodic timer 86 has expired.

Assuming that the periodic timer has not expired, the program proceeds to decision block 124 to check the CRC of the acknowledgement message 100. The cyclic redundancy code should match the data of the safety message 60 transmitted.

Again, assuming that the CRC is correct, the program proceeds to decision block 125 to determine whether the sequence count of the acknowledgment message 100 matches that of the message 84 that was sent.

If so, then at decision block 127, the data sent in message 84 is compared to the data of the acknowledgement message 100. If there is a match, then the program proceeds to decision block 129 where it loops until the periodic timer has expired, and then proceeds to process block 110 to prepare a new message 84.

This process is repeated for multiple transmissions of safety messages 84 and acknowledgement messages 100.

(2) Message Received but Corrupted

Referring now to FIG. 11 in one potential error the safety message 84 is corrupted for example by electromagnetic interference 85. In this case a message is received at the consumer 82, as indicated by FIG. 18 per process block 90, within the periodic timer value 86' as measured by process block 92 however there is an error in the CRC data as determined by decision block 112. In this case, the program proceeds to process block 114 and no action is taken and in particular no acknowledgement message 100 is returned.

Referring to FIG. 17, in this case there will be no acknowledgment message 100 received by the producer 80 at process block 102. The program proceeds to decision block 116 to determine if the periodic time interval 86 has expired. If so, the failure is indicated and the program proceeds to the safety state of process block 126.

Figure 12:
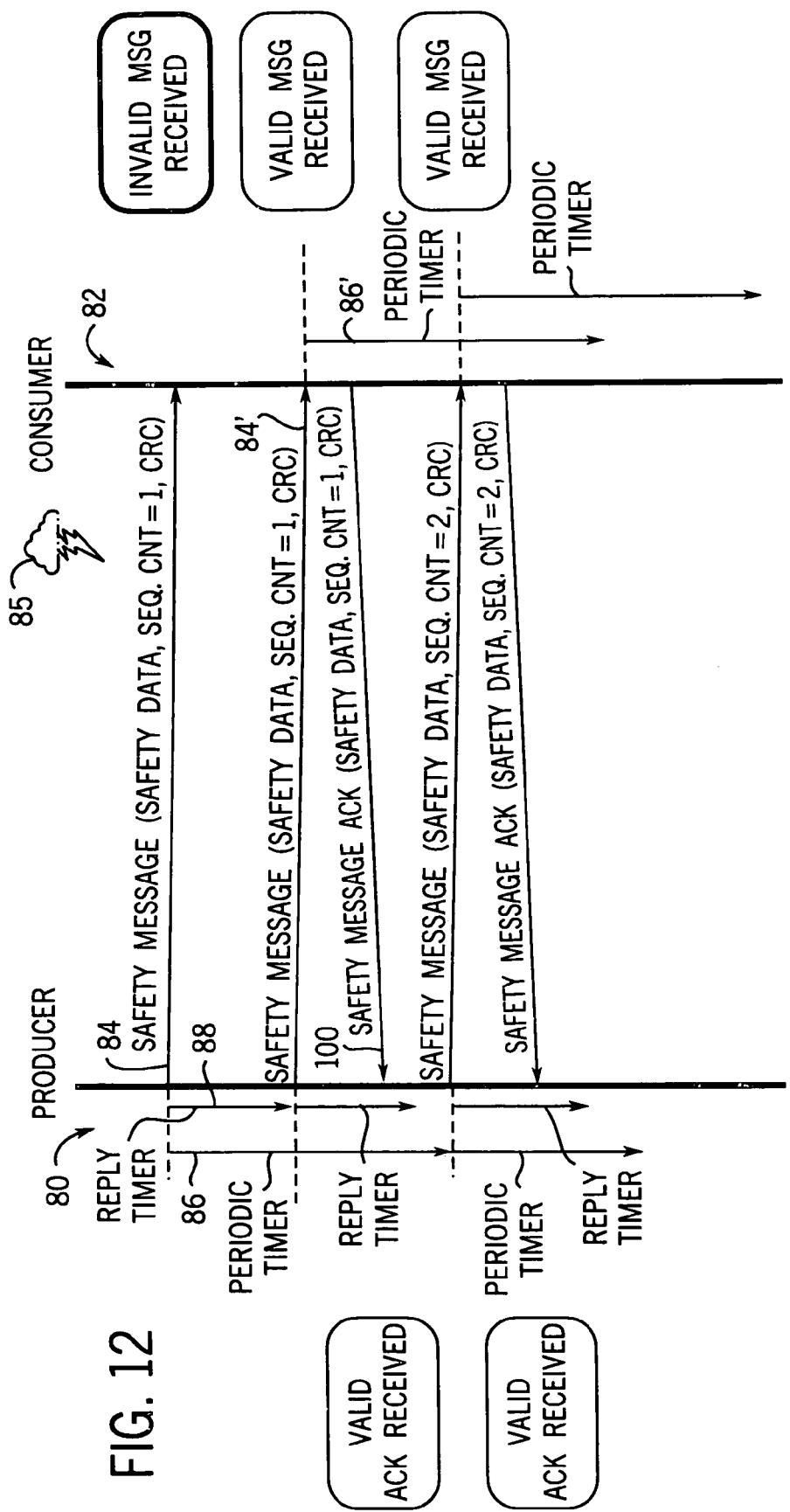
FIG. 12 is a figure similar to FIG. 11 showing protocol operation with a corrupted producer message.

If the periodic timer interval 86 has not expired, the program will proceed to decision block 118 to see if the shorter reply timer interval 88 has expired. If not, the program will loop back to process block 102. If so, the program will proceed to process block 120 to check if the retry limit has been exceeded. Initially this may not be the case and the program will proceed to process block 122 and a repeat message 84' having the same sequence count will be sent at process block 84, as also indicated by FIG. 12. If the retry limit has been exceeded, the program proceeds to the safety state 126.

This repeat message 84' will be received at the consumer 82 as indicated by process block 90 of FIG. 18 and assuming that it is correct it and that it has arrived within the periodic timer interval 86' based on the previous non-erroneous message, this message 84' results in the sending of an acknowledgment message 100 at process block 98 per the steps described above.

Typically, if only one missed transmission has occurred, the acknowledgment message 100 will occur within the periodic timer interval 86 of the producer and messages will be continued to be exchanged normally as has been previously described with respect to FIG. 11.

(3) Message Not Received

Figure 13:
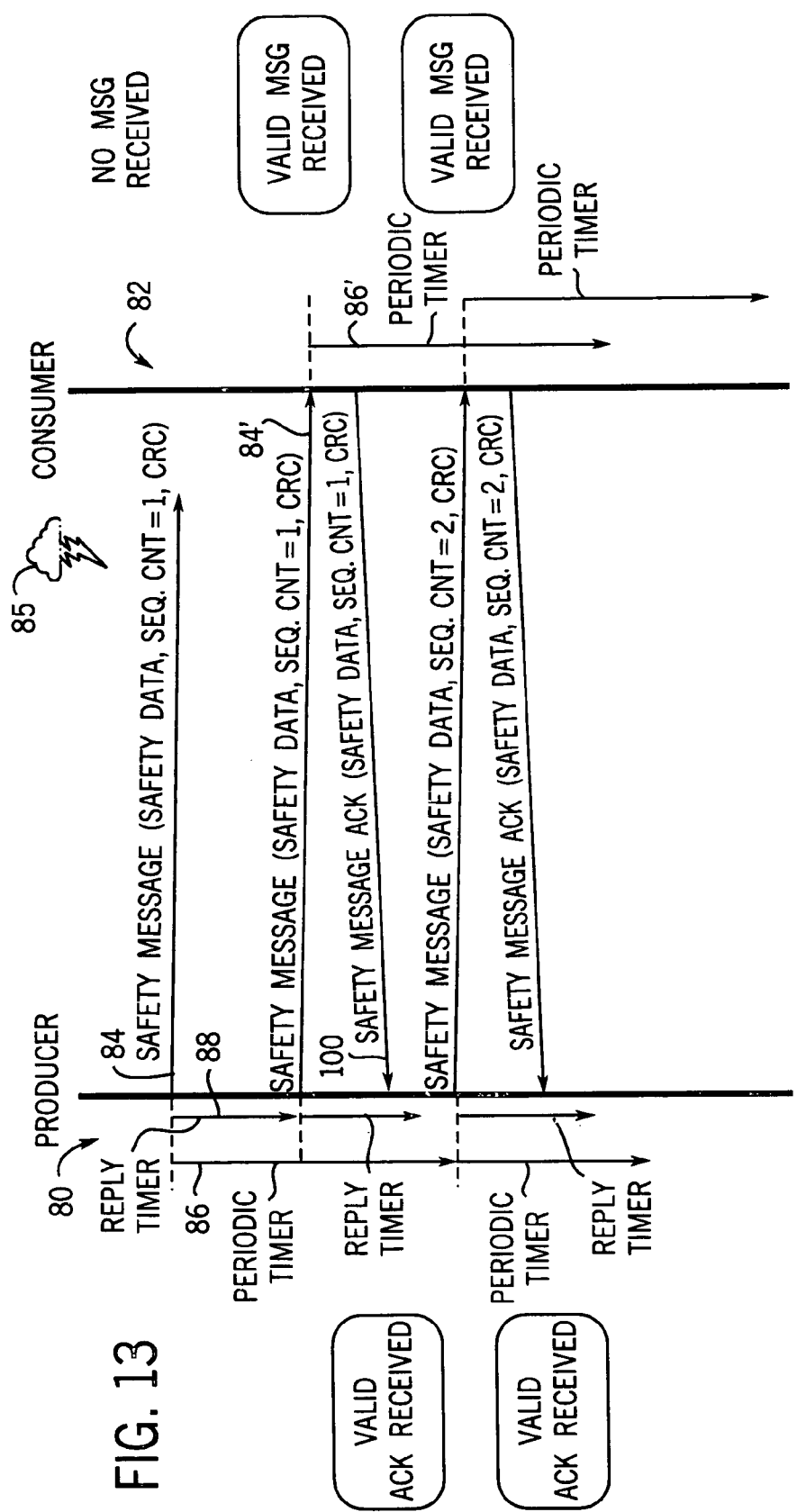
FIG. 13 is a figure similar to FIG. 11 showing protocol operation with a lost producer message.

Referring now to FIG. 13, in the previous example, the safety message 84 arrived at the consumer 82 to be detected, albeit with errors. It is possible that the safety message 84 will not arrive at the consumer 82 either as a result of such extreme interference that it is not recognizable as a message under low level network protocols, or as a result of component failures between the producer and the consumer of an intermittent nature. Under this situation, the producer 80 sends the message 84 but the consumer does not receive a message at process block 90 of FIG. 18.

The "no action" block 114 of FIG. 18 of the consumer (as described above) is thus not encountered but the result is in any case the same: the consumer 82 takes no action.

Thus, as described previously with respect to FIG. 12 at the expiration of the reply timer at the producer 80, the producer 80 will produce a second message 84' which if received will result in an acknowledgment message 100 initiating a string of normal communications.

(4) Acknowledgement Message Received but Corrupted

Figure 14:
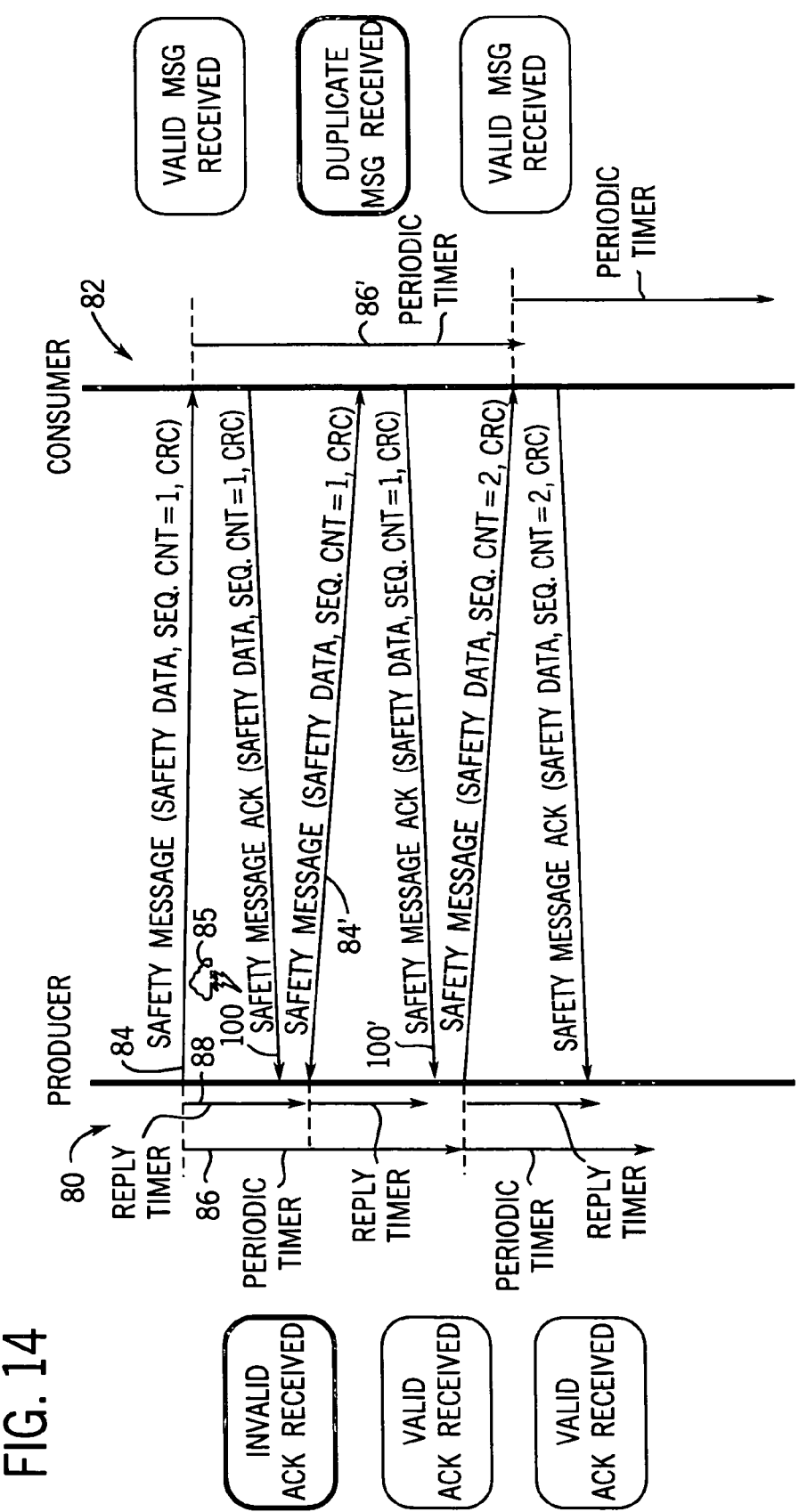
FIG. 14 is a figure similar to FIG. 11 showing protocol operation with a corrupted acknowledgement message from the consumer.

Referring now to FIG. 14 the safety message 84 may successfully reach the consumer 82 with no errors but the acknowledgement message 100 may have errors introduced by electromagnetic interference 85. In this case the producer 80 reacts as shown in FIG. 17 by decision block 106 to detect a receipt of an acknowledgment message 100 within the periodic timer interval 86. But there is an error in the data of the acknowledgment message 100.

If the CRC is correct as determined by decision block 124 and it is the sequence count that is wrong per process block 124, then the program enters the safety state 126 in which outputs and inputs of the consumer 82 are set to a predefined safety state of the configuration data. Similarly, if the sequence count is correct but the acknowledgement data does not match per decision block 127, the program proceeds to the safety state 126. If the consumer 82 is the controller 12 messages may be sent to other I/O devices, indicated in the configuration data signaling them to move to the safety state as well.

Assuming at process block 124 that the CRC code does not match the safety message 60. indicating a corruption in the safety message rather than an erroneous duplicate message, the program proceeds to decision block 118 to see if the reply timer has expired as described above. When the reply timer expires the program proceeds to process block 120 as described above and checks the retry counter to see if the retry limit has been exceeded. If so, the program proceeds to the safety state 126 however often this will not have occurred and the program proceeds to process block 122 and a retry message 84' is prepared as indicated in FIG. 14.

Assuming this retry message evokes a non-corrupted acknowledgment message 100' communication continues in normal fashion.

(5) Acknowledgement Message Not Received

Figure 15:
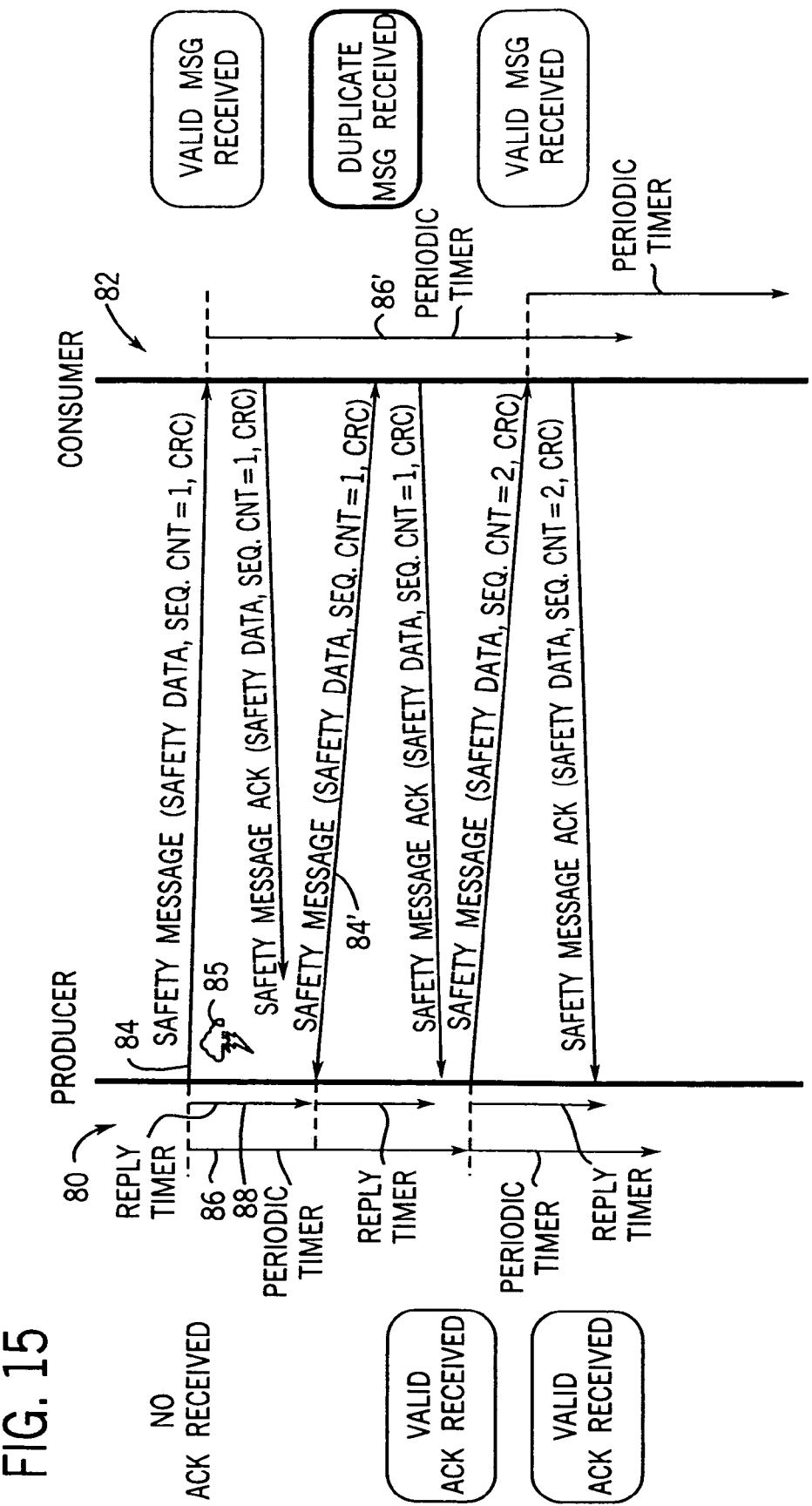
FIG. 15 is a figure similar to FIG. 11 showing protocol operation with a lost consumer acknowledgement message.
Figure 16:
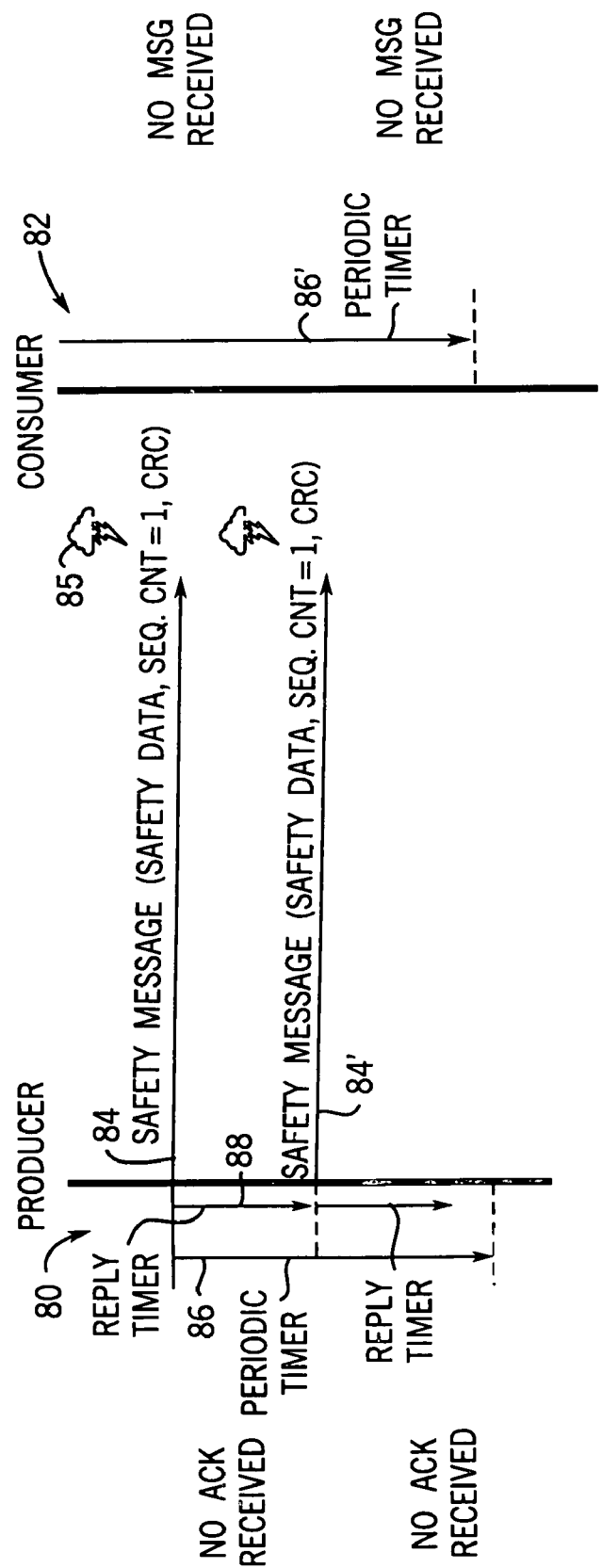
FIG. 16 is a figure similar to FIG. 11 showing protocol operation with disruption of the connection between the producer and consumer.

Referring now to FIG. 15 it is possible that the acknowledgment message 100 is lost completely either through interference or temporary communication failure. In that case, as has been previously described, a duplicate message 84 will be sent from the producer 80 however the sequence count will be identical to the sequence count of a message 84 previously received by the consumer 82. In this case as shown in FIG. 18 at process block 112 the CRC will be correct but as tested at subsequent decision block 96 the sequence code will be wrong. The program, in this case, proceeds to process block 130 to check if the sequence code is one less than that expected. If not the program proceeds to the safety state 134. If so, however, the consumer 82 must conclude that the acknowledgment message 100 was lost and an acknowledgment of the previous message is sent again by the consumer at process block 132.

(6) No Messages Received

Finally as shown in FIG. 15 the producer may be unable to connect with the consumer within the periodic interval 86' of the consumer. In that case the program proceeds to the safety state 134 directly from decision block 92 as shown in FIG. 18.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. A network safety control system comprising: a bridge for connecting a first and second communication network, each with communication protocols;
   a first communication module attached to the first communication network to transmit two messages on the first communication network to pass through the bridge to the second network, the two messages containing redundant data, the redundant data of a first message reversibly altered with respect to a second message;
   a second communication module attached to the second communication network to receive the two messages on the second communication network and compare the data of the first and second messages to detect any alteration of the redundant data by the bridge; and
   wherein errors in an operation of a standard bridge may be detected without modification of the bridge.

2. The safety control system of claim 1 wherein the reversible alteration of the data inverts bits of the data of the first message with respect to the second message.

3. The safety control system of claim 2 wherein the reversible alteration inverts all bits of the first message with respect to the second message.

4. The safety control system of claim 1 wherein the reversible alteration of the data adds data to the first message with bits inverted with respect to data added to the second message.

5. The safety control system of claim 1 wherein the reversible alteration of the first message does not modify the communication protocols.

6. The safety control system of claim 1 wherein the comparison of the data undoes the reversible modification of the first message and compares it to the second message.

7. The safety control system of claim 1 wherein the communication protocol is selected from the group consisting of Ethernet, DeviceNet, ControlNet, Fire Wire and Field Bus.

8. A safety control protocol executed on a first and second communication module communicating via messages sent on at least one network, the method comprising the steps of:
   (a) transmitting first and second redundant messages from the first communication module to the second communication module through the network, data of at least one of the first and second redundant messages being reversibly altered;
   (b) receiving the first and second messages at the second communication module to:
      (i) compare the data of the first and second message to confirm that the data matches;
      (ii) determine a time between transmission of the first and second messages and receiving of the first and second messages is less than a predetermined amount; wherein errors caused by standard network hardware can be detected.

9. The safety control protocol of claim 8 wherein the network includes a bridge communicating between portions of the network having different network protocols.

10. The safety control protocol of claim 8 wherein the second communication module compares the data of the first and second message to detect data corruption by the standard network hardware.

11. The safety control protocol of claim 8 wherein the second communication module determines the time between transmission of the first and second data to detect one of data delay and data retransmission by the standard network hardware.

12. The safety control protocol of claim 8 wherein the communication module determines the time between transmission of the first and second data is determined by a time stamp of at least one of the first messages compared with a receipt time of at least one of the first and second messages.

13. The safety control system of claim 8 wherein the reversible alteration of the data inverts bits of the data of the first message with respect to the second message.

14. The safety control system of claim 13 wherein the reversible alteration inverts all bits of the first message with respect to the second message.

15. The safety control system of claim 8 wherein the reversible alteration of the data adds data to the first message with bits inverted with respect to data added to the second message.

16. The safety control system of claim 8 wherein the network uses a standard communication protocol and the reversible alteration of the first message does not modify the standard communication protocol.

17. The safety control system of claim 8 wherein the communication protocol is selected from the group consisting of Ethernet, DeviceNet, ControlNet, Fire Wire and Field Bus.

18. A method of detecting errors in a standard network bridge joining at least two communication networks without modification of the bridge, the method comprising:
   sending a first and second message on a first communication network connected to the bridge, wherein at least one message is reversibly altered to pass through the bridge to the second network without modification of the bridge; and
   comparing the first and second messages to detect corruption of the messages by the bridge.

19. The method of claim 18 wherein the reversible alteration of the data inverts bits of data of the first message with respect to the second message.

20. The method of claim 19 wherein the reversible alteration inverts all bits of the first message with respect to the second message.

21. The method of claim 18 wherein the reversible alteration of the data adds data to the first message with bits inverted with respect to data added to the second message.

22. The method of claim 18 wherein the reversible alteration of the first message does not modify the communication protocols.

23. The method of claim 18 wherein the comparison of the data undoes the reversible modification of the first message and compares it to the second message.

24. The method of claim 18 wherein the bridge joins communication networks using communication protocol selected from the group consisting of Ethernet, DeviceNet, ControlNet, Fire Wire and Field Bus.

* * * * *